US009536375B2

(12) United States Patent
Arnone et al.

(10) Patent No.: US 9,536,375 B2
(45) **Date of Patent: *Jan. 3, 2017**

(54) USER INTERFACE MANAGER FOR A SKILL WAGERING INTERLEAVED GAME

(71) Applicant: Gamblit Gaming, LLC, Glendale, CA (US)

(72) Inventors: Miles Arnone, Sherborn, MA (US); Frank Cire, Pasadena, CA (US); Clifford Kaylin, Los Angeles, CA (US); Eric Meyerhofer, Pasadena, CA (US)

(73) Assignee: Gamblit Gaming, LLC, Glendale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/134,852

(22) Filed: Apr. 21, 2016

(65) Prior Publication Data

US 2016/0232737 A1 Aug. 11, 2016

Related U.S. Application Data

(63) Continuation of application No. 14/919,665, filed on Oct. 21, 2015, now Pat. No. 9,349,247, which is a (Continued)

(51) Int. Cl.

| | |
|---|---|
| ***A63F 13/00*** | (2014.01) |
| ***G07F 17/32*** | (2006.01) |

(52) U.S. Cl.

CPC ....... *G07F 17/3204* (2013.01); *G07F 17/3225* (2013.01); *G07F 17/3244* (2013.01)

(58) Field of Classification Search

CPC .. G07F 17/32; G07F 17/3239; G07F 17/3241; G07F 17/3262; G07F 17/3295; G07F 17/3204

(Continued)

(56) References Cited

U.S. PATENT DOCUMENTS 5,413,357 A 5/1995 Schulze et al.
5,718,429 A 2/1998 Keller (Continued)

OTHER PUBLICATIONS

U.S. Appl. No. 14/185,847 Arnone, et al., filed Feb. 20, 2014.

(Continued)

*Primary Examiner* — Allen Chan

(74) *Attorney, Agent, or Firm* — Caitlyn Ross

(57) ABSTRACT

Systems for a networked gaming system are disclosed, including an entertainment game controller connected to a game world controller, and constructed to: communicate game world information; receive a request to aggregate information; aggregate game world information, encode and associate it with a transaction identifier; receive a gambling outcome; display gambling outcome; a real world controller connected to the game world controller, and constructed to: receive a wager request; determine gambling outcome; communicate gambling outcome; the game world controller connected to the entertainment game controller and to the real world controller, and constructed to: receive game world information; determine whether or not to generate an aggregation request; generate an aggregation request; communicate plurality of transaction identifiers; receive game world information and transaction identifier; determine whether the transaction identifier is valid; disaggregate game world information, communicate wager request; receive gambling outcome; and communicate gambling outcome.

21 Claims, 18 Drawing Sheets

Related U.S. Application Data continuation of application No. 14/306,187, filed on Jun. 16, 2014, now Pat. No. 9,218,714.

(60) Provisional application No. 61/974,983, filed on Apr. 3, 2014, provisional application No. 61/905,502, filed on Nov. 18, 2013.

(58) Field of Classification Search
USPC .......................................................... 463/25
See application file for complete search history.

(56) References Cited

U.S. PATENT DOCUMENTS

| | | | |
|---|---|---|---|
| 5,785,592 | A | 7/1998 | Jacobsen |
| 5,853,324 | A | 12/1998 | Kami et al. |
| 5,963,745 | A | 10/1999 | Collins et al. |
| 6,050,895 | A | 4/2000 | Luciano |
| 6,165,071 | A | 12/2000 | Weiss |
| 6,227,974 | B1 | 5/2001 | Eilat |
| 6,267,669 | B1 | 7/2001 | Luciano |
| 6,685,563 | B1 | 2/2004 | Meekins et al. |
| 6,712,693 | B1 | 3/2004 | Hettinger |
| 6,761,632 | B2 | 7/2004 | Bansemer et al. |
| 6,761,633 | B2 | 7/2004 | Riendeau |
| 6,764,397 | B1 | 7/2004 | Robb |
| 6,811,482 | B2 | 11/2004 | Letovsky |
| 7,118,105 | B2 | 10/2006 | Benevento |
| 7,294,058 | B1 | 11/2007 | Slomiany |
| 7,326,115 | B2 | 2/2008 | Baerlocher |
| 7,361,091 | B2 | 4/2008 | Letovsky |
| 7,517,282 | B1 | 4/2009 | Pryor |
| 7,575,517 | B2 | 8/2009 | Parham et al. |
| 7,682,239 | B2 | 3/2010 | Friedman et al. |
| 7,720,733 | B2 | 5/2010 | Jung |
| 7,753,770 | B2 | 7/2010 | Walker et al. |
| 7,753,790 | B2 | 7/2010 | Nguyen |
| 7,766,742 | B2 | 8/2010 | Bennett et al. |
| 7,775,885 | B2 | 8/2010 | Van Luchene |
| 7,798,896 | B2 | 9/2010 | Katz |
| 7,828,657 | B2 | 11/2010 | Booth |
| 7,917,371 | B2 | 3/2011 | Jung et al. |
| 7,931,531 | B2 | 4/2011 | Oberberger |
| 7,938,727 | B1 | 5/2011 | Konkle |
| 7,950,993 | B2 | 5/2011 | Oberberger |
| 7,967,674 | B2 | 6/2011 | Baerlocher |
| 7,980,948 | B2 | 7/2011 | Rowe |
| 7,996,264 | B2 | 8/2011 | Kusumoto et al. |
| 8,012,023 | B2 | 9/2011 | Gates |
| 8,047,908 | B2 | 11/2011 | Walker |
| 8,047,915 | B2 | 11/2011 | Lyle |
| 8,060,829 | B2 | 11/2011 | Jung et al. |
| 8,075,383 | B2 | 12/2011 | Friedman et al. |
| 8,087,999 | B2 | 1/2012 | Oberberger |
| 8,113,938 | B2 | 2/2012 | Friedman et al. |
| 8,118,654 | B1 | 2/2012 | Nicolas |
| 8,128,487 | B2 | 3/2012 | Hamilton et al. |
| 8,135,648 | B2 | 3/2012 | Oram |
| 8,137,193 | B1 | 3/2012 | Kelly et al. |
| 8,142,272 | B2 | 3/2012 | Walker |
| 8,157,653 | B2 | 4/2012 | Buhr |
| 8,167,699 | B2 | 5/2012 | Inamura |
| 8,177,628 | B2 | 5/2012 | Manning |
| 8,182,338 | B2 | 5/2012 | Thomas |
| 8,182,339 | B2 | 5/2012 | Anderson |
| 8,187,068 | B2 | 5/2012 | Slomiany |
| 8,206,210 | B2 | 6/2012 | Walker |
| 8,308,544 | B2 | 11/2012 | Friedman |
| 8,430,735 | B2 | 4/2013 | Oberberger |
| 8,475,266 | B2 | 7/2013 | Arnone |
| 8,480,470 | B2 | 7/2013 | Napolitano et al. |
| 8,622,809 | B1 | 1/2014 | Arora et al. |
| 8,864,564 | B2 | 10/2014 | Oberberger |
| 2001/0004609 | A1 | 6/2001 | Walker et al. |
| 2001/0019965 | A1 | 9/2001 | Ochi |
| 2002/0022509 | A1 | 2/2002 | Nicastro et al. |
| 2002/0090990 | A1 | 7/2002 | Joshi et al. |
| 2002/0175471 | A1 | 11/2002 | Faith |
| 2003/0060286 | A1 | 3/2003 | Walker et al. |
| 2003/0119576 | A1 | 6/2003 | McClintic et al. |
| 2003/0139214 | A1 | 7/2003 | Wolf et al. |
| 2003/0171149 | A1 | 9/2003 | Rothschild |
| 2003/0204565 | A1 | 10/2003 | Guo et al. |
| 2003/0211879 | A1 | 11/2003 | Englman |
| 2004/0092313 | A1 | 5/2004 | Saito et al. |
| 2004/0097610 | A1 | 5/2004 | Saito |
| 2004/0102238 | A1 | 5/2004 | Taylor |
| 2004/0121839 | A1 | 6/2004 | Webb |
| 2004/0225387 | A1 | 11/2004 | Smith |
| 2005/0003878 | A1 | 1/2005 | Updike |
| 2005/0096124 | A1 | 5/2005 | Stronach |
| 2005/0116411 | A1 | 6/2005 | Herrmann et al. |
| 2005/0192087 | A1 | 9/2005 | Friedman et al. |
| 2005/0233791 | A1 | 10/2005 | Kane |
| 2005/0233806 | A1 | 10/2005 | Kane et al. |
| 2005/0239538 | A1 | 10/2005 | Dixon |
| 2005/0269778 | A1 | 12/2005 | Samberg |
| 2005/0288101 | A1 | 12/2005 | Lockton et al. |
| 2006/0003823 | A1 | 1/2006 | Zhang |
| 2006/0003830 | A1 | 1/2006 | Walker et al. |
| 2006/0035696 | A1 | 2/2006 | Walker |
| 2006/0040735 | A1 | 2/2006 | Baerlocher |
| 2006/0068913 | A1 | 3/2006 | Walker et al. |
| 2006/0084499 | A1 | 4/2006 | Moshal |
| 2006/0084505 | A1 | 4/2006 | Yoseloff |
| 2006/0135250 | A1 | 6/2006 | Rossides |
| 2006/0154710 | A1 | 7/2006 | Serafat |
| 2006/0166729 | A1 | 7/2006 | Saffari et al. |
| 2006/0189371 | A1 | 8/2006 | Walker et al. |
| 2006/0223611 | A1 | 10/2006 | Baerlocher |
| 2006/0234791 | A1 | 10/2006 | Nguyen et al. |
| 2006/0240890 | A1 | 10/2006 | Walker |
| 2006/0246403 | A1 | 11/2006 | Monpouet et al. |
| 2006/0258433 | A1 | 11/2006 | Finocchio et al. |
| 2007/0026924 | A1 | 2/2007 | Taylor |
| 2007/0035548 | A1 | 2/2007 | Jung et al. |
| 2007/0038559 | A1 | 2/2007 | Jung et al. |
| 2007/0064074 | A1 | 3/2007 | Silverbrook et al. |
| 2007/0087799 | A1 | 4/2007 | Van Luchene |
| 2007/0093299 | A1 | 4/2007 | Bergeron |
| 2007/0099696 | A1 | 5/2007 | Nguyen et al. |
| 2007/0117641 | A1 | 5/2007 | Walker et al. |
| 2007/0129149 | A1 | 6/2007 | Walker |
| 2007/0142108 | A1 | 6/2007 | Linard |
| 2007/0156509 | A1 | 7/2007 | Jung et al. |
| 2007/0167212 | A1 | 7/2007 | Nguyen |
| 2007/0167239 | A1 | 7/2007 | O'Rourke |
| 2007/0173311 | A1 | 7/2007 | Morrow et al. |
| 2007/0191104 | A1 | 8/2007 | Van Luchene |
| 2007/0202941 | A1 | 8/2007 | Miltenberger |
| 2007/0203828 | A1 | 8/2007 | Jung et al. |
| 2007/0207847 | A1 | 9/2007 | Thomas |
| 2007/0259717 | A1 | 11/2007 | Mattice |
| 2007/0293306 | A1 | 12/2007 | Nee et al. |
| 2008/0004107 | A1 | 1/2008 | Nguyen et al. |
| 2008/0014835 | A1 | 1/2008 | Weston et al. |
| 2008/0015004 | A1 | 1/2008 | Gatto et al. |
| 2008/0064488 | A1 | 3/2008 | Oh |
| 2008/0070659 | A1 | 3/2008 | Naicker |
| 2008/0070690 | A1 | 3/2008 | Van Luchene |
| 2008/0070702 | A1 | 3/2008 | Kaminkow |
| 2008/0096665 | A1 | 4/2008 | Cohen |
| 2008/0108406 | A1 | 5/2008 | Oberberger |
| 2008/0108425 | A1 | 5/2008 | Oberberger |
| 2008/0113704 | A1 | 5/2008 | Jackson |
| 2008/0119283 | A1 | 5/2008 | Baerlocher |
| 2008/0146308 | A1 | 6/2008 | Okada |
| 2008/0161081 | A1 | 7/2008 | Berman |
| 2008/0176619 | A1 | 7/2008 | Kelly |
| 2008/0191418 | A1 | 8/2008 | Lutnick et al. |
| 2008/0195481 | A1 | 8/2008 | Lutnick |
| 2008/0248850 | A1 | 10/2008 | Schugar |
| 2008/0254893 | A1 | 10/2008 | Patel |
| 2008/0274796 | A1 | 11/2008 | Lube |
| 2008/0274798 | A1 | 11/2008 | Walker et al. |

(56) References Cited

U.S. PATENT DOCUMENTS

| | | | |
|---|---|---|---|
| 2008/0311980 | A1 | 12/2008 | Cannon |
| 2008/0318668 | A1 | 12/2008 | Ching |
| 2009/0011827 | A1 | 1/2009 | Englman |
| 2009/0023489 | A1 | 1/2009 | Toneguzzo |
| 2009/0023492 | A1 | 1/2009 | Erfanian |
| 2009/0061974 | A1 | 3/2009 | Lutnick et al. |
| 2009/0061975 | A1 | 3/2009 | Ditchev |
| 2009/0061991 | A1 | 3/2009 | Popovich |
| 2009/0061997 | A1 | 3/2009 | Popovich |
| 2009/0061998 | A1 | 3/2009 | Popovich |
| 2009/0061999 | A1 | 3/2009 | Popovich |
| 2009/0082093 | A1 | 3/2009 | Okada |
| 2009/0088239 | A1 | 4/2009 | Iddings |
| 2009/0098934 | A1 | 4/2009 | Amour |
| 2009/0118006 | A1 | 5/2009 | Kelly et al. |
| 2009/0124344 | A1 | 5/2009 | Mitchell et al. |
| 2009/0131158 | A1 | 5/2009 | Brunet De Courssou et al. |
| 2009/0131175 | A1 | 5/2009 | Kelly et al. |
| 2009/0143141 | A1 | 6/2009 | Wells |
| 2009/0149233 | A1 | 6/2009 | Strause et al. |
| 2009/0156297 | A1 | 6/2009 | Andersson et al. |
| 2009/0176560 | A1 | 7/2009 | Herrmann et al. |
| 2009/0176566 | A1 | 7/2009 | Kelly |
| 2009/0181777 | A1 | 7/2009 | Christiani |
| 2009/0221355 | A1 | 9/2009 | Dunaevsky et al. |
| 2009/0239610 | A1 | 9/2009 | Olive |
| 2009/0247272 | A1 | 10/2009 | Abe |
| 2009/0270164 | A1 | 10/2009 | Seelig |
| 2009/0275393 | A1 | 11/2009 | Kisenwether |
| 2009/0291755 | A1 | 11/2009 | Walker et al. |
| 2009/0309305 | A1 | 12/2009 | May |
| 2009/0312093 | A1 | 12/2009 | Walker et al. |
| 2009/0325686 | A1 | 12/2009 | Davis |
| 2010/0004058 | A1 | 1/2010 | Acres |
| 2010/0016056 | A1 | 1/2010 | Thomas et al. |
| 2010/0029373 | A1 | 2/2010 | Graham et al. |
| 2010/0035674 | A1 | 2/2010 | Slomiany |
| 2010/0056247 | A1 | 3/2010 | Nicely |
| 2010/0056260 | A1 | 3/2010 | Fujimoto |
| 2010/0062836 | A1 | 3/2010 | Young |
| 2010/0093420 | A1 | 4/2010 | Wright |
| 2010/0093444 | A1 | 4/2010 | Biggar et al. |
| 2010/0105454 | A1 | 4/2010 | Weber |
| 2010/0120525 | A1 | 5/2010 | Baerlocher et al. |
| 2010/0124983 | A1 | 5/2010 | Gowin et al. |
| 2010/0137047 | A1 | 6/2010 | Englman et al. |
| 2010/0174593 | A1 | 7/2010 | Cao |
| 2010/0184509 | A1 | 7/2010 | Sylla et al. |
| 2010/0203940 | A1 | 8/2010 | Alderucci et al. |
| 2010/0210344 | A1 | 8/2010 | Edidin et al. |
| 2010/0227672 | A1 | 9/2010 | Amour |
| 2010/0227688 | A1 | 9/2010 | Lee |
| 2010/0240436 | A1 | 9/2010 | Wilson et al. |
| 2010/0304825 | A1 | 12/2010 | Davis |
| 2010/0304839 | A1 | 12/2010 | Johnson |
| 2010/0304842 | A1 | 12/2010 | Friedman et al. |
| 2011/0009177 | A1 | 1/2011 | Katz |
| 2011/0009178 | A1 | 1/2011 | Gerson |
| 2011/0045896 | A1 | 2/2011 | Sak et al. |
| 2011/0077087 | A1 | 3/2011 | Walker et al. |
| 2011/0082571 | A1 | 4/2011 | Murdock et al. |
| 2011/0105206 | A1 | 5/2011 | Rowe et al. |
| 2011/0107239 | A1 | 5/2011 | Adoni |
| 2011/0109454 | A1 | 5/2011 | McSheffrey |
| 2011/0111820 | A1 | 5/2011 | Filipour |
| 2011/0111837 | A1 | 5/2011 | Gagner |
| 2011/0111841 | A1 | 5/2011 | Tessmer |
| 2011/0118011 | A1 | 5/2011 | Filipour et al. |
| 2011/0201413 | A1 | 8/2011 | Oberberger |
| 2011/0207523 | A1 | 8/2011 | Filipour et al. |
| 2011/0212766 | A1 | 9/2011 | Bowers |
| 2011/0212767 | A1 | 9/2011 | Barclay |
| 2011/0218028 | A1 | 9/2011 | Acres |
| 2011/0218035 | A1 | 9/2011 | Thomas |
| 2011/0230258 | A1 | 9/2011 | Van Luchene |
| 2011/0230260 | A1 | 9/2011 | Morrow et al. |
| 2011/0230267 | A1 | 9/2011 | Van Luchene |
| 2011/0244944 | A1 | 10/2011 | Baerlocher |
| 2011/0263312 | A1 | 10/2011 | De Waal |
| 2011/0269522 | A1 | 11/2011 | Nicely et al. |
| 2011/0275440 | A1 | 11/2011 | Faktor |
| 2011/0287828 | A1 | 11/2011 | Anderson et al. |
| 2011/0287841 | A1 | 11/2011 | Watanabe |
| 2011/0312408 | A1 | 12/2011 | Okuaki |
| 2011/0319169 | A1 | 12/2011 | Lam |
| 2012/0004747 | A1 | 1/2012 | Kelly |
| 2012/0028718 | A1 | 2/2012 | Barclay et al. |
| 2012/0058814 | A1 | 3/2012 | Lutnick |
| 2012/0077569 | A1 | 3/2012 | Watkins |
| 2012/0108323 | A1 | 5/2012 | Kelly |
| 2012/0135793 | A1 | 5/2012 | Antonopoulos |
| 2012/0202587 | A1 | 8/2012 | Allen |
| 2012/0302311 | A1 | 11/2012 | Luciano |
| 2012/0322545 | A1 | 12/2012 | Arnone et al. |
| 2013/0029760 | A1 | 1/2013 | Wickett |
| 2013/0131848 | A1 | 5/2013 | Arnone et al. |
| 2013/0190074 | A1 | 7/2013 | Arnone et al. |
| 2013/0260869 | A1 | 10/2013 | Basallo et al. |
| 2014/0087801 | A1 | 3/2014 | Nicely et al. |
| 2014/0087808 | A1 | 3/2014 | Basallo et al. |
| 2014/0087809 | A1 | 3/2014 | Leupp et al. |
| 2014/0357350 | A1 | 12/2014 | Weingardt et al. |

OTHER PUBLICATIONS

U.S. Appl. No. 14/203,459 Arnone, et al., filed Mar. 10, 2014.
U.S. Appl. No. 14/205,272 Arnone, et al., filed Mar. 11, 2014.
U.S. Appl. No. 13/854,658, Arnone, et al., filed Apr. 1, 2013.
U.S. Appl. No. 13/855,676, Arnone, et al., filed Apr. 2, 2013.
U.S. Appl. No. 13/872,946, Arnone, et al., filed Apr. 29, 2013.
U.S. Appl. No. 13/886,245, Arnone, et al., filed May 2, 2013.
U.S. Appl. No. 13/888,326, Arnone, et al., filed May 6, 2013.
U.S. Appl. No. 13/890,207, Arnone, et al., filed May 8, 2013.
U.S. Appl. No. 13/896,783, Arnone, et al., filed May 17, 2013.
U.S. Appl. No. 13/898,222, Arnone, et al., filed May 20, 2013.
U.S. Appl. No. 13/900,363, Arnone, et al., filed May 22, 2013.
U.S. Appl. No. 13/903,895, Arnone, et al., filed May 28, 2013.
U.S. Appl. No. 13/917,513, Arnone, et al., filed Jun. 13, 2013.
U.S. Appl. No. 13/917,529, Arnone, et al., filed Jun. 13, 2013.
U.S. Appl. No. 13/920,031, Arnone, et al., filed Jun. 17, 2013.
U.S. Appl. No. 13/928,166, Arnone, et al., filed Jun. 26, 2013.
U.S. Appl. No. 13/935,410, Arnone, et al., filed Jul. 3, 2013.
U.S. Appl. No. 13/935,468, Arnone, et al., filed Jul. 3, 2013.
U.S. Appl. No. 13/686,876, Arnone, et al., filed Nov. 27, 2012.
U.S. Appl. No. 13/944,662, Arnone, et al., filed Jul. 17, 2013.
U.S. Appl. No. 13/962,815, Arnone, et al., filed Aug. 8, 2013.
U.S. Appl. No. 13/962,839, Meyerhofer, et al., filed Aug. 8, 2013.
U.S. Appl. No. 14/018,315, Arnone, et al., filed Sep. 4, 2013.
U.S. Appl. No. 14/019,384, Arnone, et al., filed Sep. 5, 2013.
U.S. Appl. No. 14/023,432, Arnone, et al., filed Sep. 10, 2013.
U.S. Appl. No. 13/600,671, Arnone, et al., filed Aug. 31, 2012.
U.S. Appl. No. 13/582,408, Arnone, et al., filed Sep. 26, 2012.
U.S. Appl. No. 13/849,458, Arnone, et al., filed Mar. 22, 2013.
U.S. Appl. No. 14/135,562, Arnone, et al., filed Dec. 19, 2013.
U.S. Appl. No. 14/080,767, Arnone, et al., filed Nov. 14, 2013.
U.S. Appl. No. 14/043,838, Arnone, et al., filed Oct. 1, 2013.
U.S. Appl. No. 14/162,735, Arnone, et al., filed Jan. 23, 2014.
U.S. Appl. No. 14/161,230, Arnone, et al., filed Jan. 22, 2014.
U.S. Appl. No. 14/083,331, Arnone, et al., filed Nov. 18, 2013.
U.S. Appl. No. 14/014,310, Arnone, et al., filed Aug. 29, 2013.
U.S. Appl. No. 14/152,953, Arnone, et al., filed Jan. 10, 2014.
U.S. Appl. No. 14/162,724, Arnone, et al., filed Jan. 23, 2014.
U.S. Appl. No. 14/104,897, Arnone, et al., filed Dec. 12, 2013.
U.S. Appl. No. 14/174,813 Arnone, et al., filed Feb. 6, 2014.
U.S. Appl. No. 14/175,986 Arnone, et al., filed Feb. 7, 2014.
U.S. Appl. No. 14/176,014 Arnone, et al., filed Feb. 7, 2014.
U.S. Appl. No. 14/179,487 Arnone, et al., filed Feb. 12, 2014.
U.S. Appl. No. 14/179,492 Arnone, et al., filed Feb. 12, 2014.
U.S. Appl. No. 14/181,190 Arnone, et al., filed Feb. 14, 2014.

(56) References Cited

OTHER PUBLICATIONS

U.S. Appl. No. 14/186,393 Arnone, et al., filed Feb. 21, 2014.
U.S. Appl. No. 14/188,587 Arnone, et al., filed Feb. 24, 2014.
U.S. Appl. No. 14/205,303 Arnone, et al., filed Mar. 11, 2014.
U.S. Appl. No. 14/205,306 Arnone, et al., filed Mar. 11, 2014.
U.S. Appl. No. 14/209,485 Arnone, et al., filed Mar. 13, 2014.
U.S. Appl. No. 14/214,310 Arnone, et al., filed Mar. 14, 2014.
U.S. Appl. No. 14/222,520 Arnone, et al., filed Mar. 21, 2014.
U.S. Appl. No. 14/253,813 Arnone, et al., filed Apr. 15, 2014.
U.S. Appl. No. 14/255,253 Arnone, et al., filed Apr. 17, 2014.
U.S. Appl. No. 14/255,919 Arnone, et al. filed Apr. 17, 2014.
U.S. Appl. No. 14/263,988 Arnone, et al. filed Apr. 28, 2014.
U.S. Appl. No. 14/270,335 Arnone, et al. filed May 5, 2014.
U.S. Appl. No. 14/271,360 Arnone, et al. filed May 6, 2014.
U.S. Appl. No. 13/961,849 Arnone, et al. filed Aug. 7, 2013.
U.S. Appl. No. 13/746,850 Arnone, et al. filed Jan. 22, 2013.
U.S. Appl. No. 14/288,169 Arnone, et al. filed May 27, 2014.
U.S. Appl. No. 14/304,027 Arnone, et al. filed Jun. 13, 2014.
U.S. Appl. No. 14/306,187 Arnone, et al. filed Jun. 16, 2014.
U.S. Appl. No. 14/312,623 Arnone, et al. filed Jun. 23, 2014.
U.S. Appl. No. 14/330,249 Arnone, et al. filed Jul. 14, 2014.
U.S. Appl. No. 14/339,142 Arnone, et al. filed Jul. 23, 2014.
U.S. Appl. No. 14/458,206 Arnone, et al. filed Aug. 12, 2014.
U.S. Appl. No. 14/461,344 Arnone, et al. filed Aug. 15, 2014.
U.S. Appl. No. 14/462,516 Arnone, et al. filed Aug. 18, 2014.
U.S. Appl. No. 14/467,646 Meyerhofer, et al. filed Aug. 25, 2014.
U.S. Appl. No. 14/474,023 Arnone, et al. filed Aug. 29, 2014.
U.S. Appl. No. 14/486,895 Arnone, et al. filed Sep. 15, 2014.
U.S. Appl. No. 14/507,206 Arnone, et al. filed Oct. 6, 2014.
U.S. Appl. No. 14/521,338 Arnone, et al. filed Oct. 22, 2014.
U.S. Appl. No. 14/535,808 Arnone, et al. filed Nov. 7, 2014.
U.S. Appl. No. 14/535,816 Arnone, et al. filed Nov. 7, 2014.
U.S. Appl. No. 14/536,231 Arnone, et al. filed Nov. 7, 2014.
U.S. Appl. No. 14/536,280 Arnone, et al. filed Nov. 7, 2014.
U.S. Appl. No. 14/549,137 Arnone, et al. filed Nov. 20, 2014.
U.S. Appl. No. 14/550,802 Arnone, et al. filed Nov. 21, 2014.
U.S. Appl. No. 14/555,401 Arnone, et al. filed Nov. 26, 2014.
U.S. Appl. No. 14/559,840 Arnone, et al. filed Dec. 3, 2014.
U.S. Appl. No. 14/564,834 Arnone, et al. filed Dec. 9, 2014.
U.S. Appl. No. 14/570,746 Arnone, et al. filed Dec. 15, 2014.
U.S. Appl. No. 14/570,857 Arnone, et al. filed Dec. 15, 2014.
U.S. Appl. No. 14/586,626 Arnone, et al. filed Dec. 30, 2014.
U.S. Appl. No. 14/586,639 Arnone, et al. filed Dec. 30, 2014.
U.S. Appl. No. 14/586,645 Arnone, et al. filed Dec. 30, 2014.
U.S. Appl. No. 14/598,151 Arnone, et al. filed Jan. 15, 2015.
U.S. Appl. No. 14/601,063 Arnone, et al. filed Jan. 20, 2015.
U.S. Appl. No. 14/601,108 Arnone, et al. filed Jan. 20, 2015.
U.S. Appl. No. 14/608,000 Arnone, et al. filed Jan. 28, 2015.
U.S. Appl. No. 14/608,087 Arnone, et al. filed Jan. 28, 2015.
U.S. Appl. No. 14/608,093 Arnone, et al. filed Jan. 28, 2015.
U.S. Appl. No. 14/610,897 Arnone, et al. filed Jan. 30, 2015.
U.S. Appl. No. 14/611,077 Arnone, et al. filed Jan. 30, 2015.
U.S. Appl. No. 14/604,629 Arnone, et al. filed Jan. 23, 2015.
U.S. Appl. No. 14/625,475 Arnone, et al. filed Feb. 18, 2015.
U.S. Appl. No. 14/617,852 Arnone, et al. filed Feb. 9, 2015.
U.S. Appl. No. 14/627,428 Arnone, et al. filed Feb. 20, 2015.
U.S. Appl. No. 14/642,427 Arnone, et al. filed Mar. 9, 2015.
U.S. Appl. No. 14/665,991 Arnone, et al. filed Mar. 23, 2015.
U.S. Appl. No. 14/666,010 Arnone, et al. filed Mar. 23, 2015.
U.S. Appl. No. 14/666,022 Arnone, et al. filed Mar. 23, 2015.
U.S. Appl. No. 14/642,623 Arnone, et al. filed Mar. 9, 2015.
U.S. Appl. No. 14/663,337 Arnone, et al. filed Mar. 19, 2015.
U.S. Appl. No. 14/666,284 Arnone, et al. filed Mar. 23, 2015.
U.S. Appl. No. 14/679,885 Arnone, et al. filed Apr. 6, 2015.
U.S. Appl. No. 14/685,378 Arnone, et al. filed Apr. 13, 2015.
U.S. Appl. No. 14/686,675 Arnone, et al. filed Apr. 14, 2015.
U.S. Appl. No. 14/686,678 Arnone, et al. filed Apr. 14, 2015.
U.S. Appl. No. 14/701,430 Arnone, et al. filed Apr. 30, 2015.
U.S. Appl. No. 14/703,721 Arnone, et al. filed May 4, 2015.
U.S. Appl. No. 14/708,138 Arnone, et al. filed May 8, 2015.
U.S. Appl. No. 14/708,141 Arnone, et al. filed May 8, 2015.
U.S. Appl. No. 14/708,160 Arnone, et al. filed May 8, 2015.
U.S. Appl. No. 14/708,161 Arnone, et al. filed May 8, 2015.
U.S. Appl. No. 14/708,162 Arnone, et al. filed May 8, 2015.
U.S. Appl. No. 14/710,483 Arnone, et al. filed May 12, 2015.
U.S. Appl. No. 14/714,084 Arnone, et al. filed May 15, 2015.
U.S. Appl. No. 14/715,463 Arnone, et al. filed May 18, 2015.
U.S. Appl. No. 14/720,620 Arnone, et al. filed May 22, 2015.
U.S. Appl. No. 14/720,624 Arnone, et al. filed May 22, 2015.
U.S. Appl. No. 14/720,626 Arnone, et al. filed May 22, 2015.
U.S. Appl. No. 14/727,726 Arnone, et al. filed Jun. 1, 2015.
U.S. Appl. No. 14/730,183 Arnone, et al. filed Jun. 3, 2015.
U.S. Appl. No. 14/731,321 Arnone, et al. filed Jun. 4, 2015.
U.S. Appl. No. 14/740,078 Arnone, et al. filed Jun. 15, 2015.
U.S. Appl. No. 14/742,517 Arnone, et al. filed Jun. 17, 2015.
U.S. Appl. No. 14/743,708 Arnone, et al. filed Jun. 18, 2015.
U.S. Appl. No. 14/746,731 Arnone, et al. filed Jun. 22, 2015.
U.S. Appl. No. 14/748,122 Arnone, et al. filed Jun. 23, 2015.
U.S. Appl. No. 14/788,581 Arnone, et al. filed Jun. 30, 2015.
U.S. Appl. No. 14/793,685 Arnone, et al. filed Jul. 7, 2015.
U.S. Appl. No. 14/793,704 Arnone, et al. filed Jul. 7, 2015.
U.S. Appl. No. 14/797,016 Arnone, et al. filed Jul. 10, 2015.
U.S. Appl. No. 14/799,481 Arnone, et al. filed Jul. 14, 2015.
U.S. Appl. No. 14/815,764 Arnone, et al. filed Jul. 31, 2015.
U.S. Appl. No. 14/815,774 Arnone, et al. filed Jul. 31, 2015.
U.S. Appl. No. 14/817,032 Arnone, et al. filed Aug. 3, 2015.
U.S. Appl. No. 14/822,890 Arnone, et al. filed Aug. 10, 2015.
U.S. Appl. No. 14/823,951 Arnone, et al. filed Aug. 11, 2015.
U.S. Appl. No. 14/823,987 Arnone, et al. filed Aug. 11, 2015.
U.S. Appl. No. 14/825,056 Arnone, et al. filed Aug. 12, 2015.
U.S. Appl. No. 14/835,590 Arnone, et al. filed Aug. 25, 2015.
U.S. Appl. No. 14/836,902 Arnone, et al. filed Aug. 26, 2015.
U.S. Appl. No. 14/839,647 Arnone, et al. filed Aug. 28, 2015.
U.S. Appl. No. 14/842,684 Arnone, et al. filed Sep. 1, 2015.
U.S. Appl. No. 14/842,785 Arnone, et al. filed Sep. 1, 2015.
U.S. Appl. No. 14/854,021 Arnone, et al. filed Sep. 14, 2015.
U.S. Appl. No. 14/855,322 Arnone, et al. filed Sep. 15, 2015.
U.S. Appl. No. 14/859,065 Arnone, et al. filed Sep. 18, 2015.
U.S. Appl. No. 14/865,422 Arnone, et al. filed Sep. 25, 2015.
U.S. Appl. No. 14/867,809 Arnone, et al. filed Sep. 28, 2015.
U.S. Appl. No. 14/868,287 Arnone, et al. filed Sep. 28, 2015.
U.S. Appl. No. 14/868,364 Arnone, et al. filed Sep. 28, 2015.
U.S. Appl. No. 14/869,809 Arnone, et al. filed Sep. 29, 2015.
U.S. Appl. No. 14/869,819 Arnone, et al. filed Sep. 29, 2015.
U.S. Appl. No. 14/885,894 Arnone, et al. filed Oct. 16, 2015.
U.S. Appl. No. 14/919,665 Arnone, et al. filed Oct. 21, 2015.
U.S. Appl. No. 14/942,844 Arnone, et al. filed Nov. 16, 2015.
U.S. Appl. No. 14/942,883 Arnone, et al. filed Nov. 16, 2015.
U.S. Appl. No. 141949,759 Arnone, et al. filed Nov. 23, 2015.
U.S. Appl. No. 14/952,758 Arnone, et al. filed Nov. 25, 2015.
U.S. Appl. No. 14/952,769 Arnone, et al. filed Nov. 25, 2015.
U.S. Appl. No. 14/954,922 Arnone, et al. filed Nov. 30, 2015.
U.S. Appl. No. 14/954,931 Arnone, et al. filed Nov. 30, 2015.
U.S. Appl. No. 14/955,000 Arnone, et al. filed Nov. 30, 2015.
U.S. Appl. No. 14/956,301 Arnone, et al. filed Dec. 1, 2015.
U.S. Appl. No. 14/965,231 Arnone, et al. filed Dec. 10, 2015.
U.S. Appl. No. 14/965,846 Arnone, et al. filed Dec. 10, 2015.
U.S. Appl. No. 14/981,640 Arnone, et al. filed Dec. 28, 2015.
U.S. Appl. No. 14/981,775 Arnone, et al. filed Dec. 28, 2015.
U.S. Appl. No. 14/984,943 Arnone, et al. filed Dec. 30, 2015.
U.S. Appl. No. 14/984,965 Arnone, et al. filed Dec. 30, 2015.
U.S. Appl. No. 14/984,978 Arnone, et al. filed Dec. 30, 2015.
U.S. Appl. No. 14/985,107 Arnone, et al. filed Dec. 30, 2015.
U.S. Appl. No. 14/995,151 Arnone, et al. filed Jan. 13, 2016.
U.S. Appl. No. 14/974,432 Arnone, et al. filed Dec. 18, 2015.
U.S. Appl. No. 14/997,413 Arnone, et al. filed Jan. 15, 2016.
U.S. Appl. No. 15/002,233 Arnone, et al. filed Jan. 20, 2016.
U.S. Appl. No. 15/005,944 Arnone, et al. filed Jan. 25, 2016.
U.S. Appl. No. 15/011,322 Arnone, et al. filed Jan. 29, 2016.
U.S. Appl. No. 15/051,535 Arnone, et al. filed Feb. 23, 2016.
U.S. Appl. No. 15/053,236 Arnone, et al. filed Feb. 25, 2016.
U.S. Appl. No. 15/057,095 Arnone, et al. filed Feb. 29, 2016.
U.S. Appl. No. 15/060,502 Arnone, et al. filed Mar. 3, 2016.

(56) References Cited

OTHER PUBLICATIONS

U.S. Appl. No. 15/063,365 Arnone, et al. filed Mar. 7, 2016.
U.S. Appl. No. 15/063,496 Arnone, et al. filed Mar. 7, 2016.
U.S. Appl. No. 15/073,602 Arnone, et al. filed Mar. 17, 2016.
U.S. Appl. No. 15/074,999 Arnone, et al. filed Mar. 18, 2016.
U.S. Appl. No. 15/077,574 Arnone, et al. filed Mar. 22, 2016.
U.S. Appl. No. 15/083,284 Arnone, et al. filed Mar. 28, 2016.
U.S. Appl. No. 15/091,395 Arnone, et al. filed Apr. 5, 2016.
U.S. Appl. No. 15/093,685 Arnone, et al. filed Apr. 7, 2016.
U.S. Appl. No. 15/098,287 Arnone, et al. filed Apr. 13, 2016.
U.S. Appl. No. 15/098,313 Arnone, et al. filed Apr. 13, 2016.
U.S. Appl. No. 15/130,101 Arnone, et al. filed Apr. 15, 2016.
U.S. Appl. No. 15/133,624 Arnone, et al. filed Apr. 20, 2016.

USER INTERFACE MANAGER FOR A SKILL WAGERING INTERLEAVED GAME

CROSS REFERENCE TO RELATED APPLICATIONS

The present application is a continuation of U.S. patent application Ser. No. 14/919,665, filed Oct. 21, 2015, which is a continuation of U.S. patent application Ser. No. 14/306,187, filed Jun. 16, 2014, issued Dec. 22, 2015 as U.S. Pat. No. 9,218,714, which claims priority to and the benefit of U.S. Provisional Patent Application No. 61/905,502, filed Nov. 18, 2013, and U.S. Provisional Patent Application No. 61/974,983, filed Apr. 3, 2014 the entire contents of each of which are hereby incorporated by reference herein.

FIELD

Embodiments of the invention relate to a user interface manager for a skill wagering interleaved game.

BACKGROUND

The gaming machine manufacturing industry has traditionally developed gaming machines with a gambling game. A gambling game is typically a game of chance, which is a game where the outcome of the game is generally dependent solely on chance (such as a slot machine). A game of chance can be contrasted with a game of skill where the outcome of the game can depend upon a player's skill with the game. Gambling games are typically not as interactive and do not include graphics as sophisticated as an entertainment game, which is a game of skill such as a video game.

In conventional networked-based interactive games, a game server is connected to a player device over a network. The game server creates the game content and communicates the game content to the player device over the network. The player device receives the game content and displays the game content to a player. The player's device receives player inputs and communicates the player inputs to the game server. In such conventional systems, continuous and synchronized communications at a high rate need to be maintained between the game server and the player's device in order that the game remain responsive to the player. Game response is adversely affected when certain conditions occur, such as when the network becomes congested, connectivity between the player's device and the game server is lost, and/or the game server becomes busy. Various embodiments of the invention ameliorate the effects of these conditions.

SUMMARY

Systems and methods in accordance with embodiments of the invention provide a user interface or manager for use in a skill wagering interleaved game.

An embodiment includes an entertainment game controller connected by a network to a game world controller, wherein the entertainment game controller is constructed to: communicate to the game world controller via the network, an initialization request including player information of a player; receive, from the game world controller via the network, a plurality of transaction identifiers; communicate, to the game world controller via the network, game world information of an entertainment game and an associated transaction identifier from the plurality of transaction identifiers; receive, from the game world controller via the network, a gambling outcome and game world resources; display the gambling outcome; and integrate the game world resources into the entertainment game; a real world controller connected by the network to the game world controller, wherein the real world controller is constructed to: receive, from the game world controller via the network, a wager request; determine the gambling outcome based on the wager request; and communicate, to the game world controller via the network, the gambling outcome; and the game world controller connected to the entertainment game controller and connected to the real world controller by the network, wherein the game world controller is constructed to: receive, from the entertainment game controller via the network, the initialization request; determine whether or not the player is authorized based on the player information included in the initialization request; generate the plurality of transaction identifiers in response to the player being authorized; communicate to the entertainment game controller via the network, the plurality of transaction identifiers; receive from the entertainment game controller via the network, the game world information and the associated transaction identifier; determine whether or not the associated transaction identifier is valid; responsive to the transaction identifier being valid, communicate, to the real world controller via the network, the wager request; receive, from the real world controller via the network, the gambling outcome; determine the game world resources based on the gambling outcome; and communicate to the entertainment game controller via the network, the gambling outcome and the game world resources.

In a further embodiment, the player information comprises information regarding an identity of the player.

In a further embodiment, the player information comprises authorization information regarding whether the player is authorized to play the game.

In a further embodiment, the player information comprises account information of an amount of credits associated with the player.

In a further embodiment, the game world controller is further constructed to: store the plurality of transaction identifiers in a memory; and associate the plurality of transaction identifiers with the game world information.

In a further embodiment, the player information comprises location information associated with the player.

An embodiment includes an entertainment game controller connected by a network to a game world controller, wherein the entertainment game controller is constructed to: communicate to the game world controller via the network, an initialization request including player information of a player; receive, from the game world controller via the network, a plurality of transaction identifiers; communicate, to the game world controller via the network, game world information of an entertainment game and an associated transaction identifier from the plurality of transaction identifiers; receive, from the game world controller via the network, a gambling outcome and game world resources; display the gambling outcome; and integrate the game world resources into the entertainment game; and the game world controller connected to the entertainment game controller and connected to a real world controller by the network, wherein the game world controller is constructed to: receive, from the entertainment game controller via the network, the initialization request; determine whether or not the player is authorized based on the player information included in the initialization request; generate the plurality of transaction identifiers in response to the player being authorized; communicate to the entertainment game controller via the network, the plurality of transaction identifiers; receive from the entertainment game controller via the network, the game world information and the associated transaction identifier; determine whether or not the associated transaction identifier is valid; responsive to the transaction identifier being valid, communicate, to the real world controller via the network, a wager request; receive, from the real world controller via the network, the gambling outcome; determine the game world resources based on the gambling outcome; and communicate to the entertainment game controller via the network, the gambling outcome and the game world resources.

An embodiment includes a real world controller connected by the network to the game world controller, wherein the real world controller is constructed to: receive, from the game world controller via the network, a wager request; determine a gambling outcome based on the wager request; and communicate, to the game world controller via the network, the gambling outcome; and the game world controller connected to an entertainment game controller and connected to the real world controller by the network, wherein the game world controller is constructed to: receive, from the entertainment game controller via the network, an initialization request including player information of a player; determine whether or not the player is authorized based on the player information included in the initialization request; generate a plurality of transaction identifiers in response to the player being authorized; communicate to the entertainment game controller via the network, the plurality of transaction identifiers; receive from the entertainment game controller via the network, game world information of an entertainment game and an associated transaction identifier from the plurality of transaction identifiers; determine whether or not the associated transaction identifier is valid; responsive to the transaction identifier being valid, communicate, to the real world controller via the network, the wager request; receive, from the real world controller via the network, the gambling outcome; determine game world resources based on the gambling outcome; and communicate to the entertainment game controller via the network, the gambling outcome and the game world resources, wherein the entertainment game controller displays the gambling outcome and integrates the game world resources into the entertainment game.

DETAILED DESCRIPTION

Figure 1:
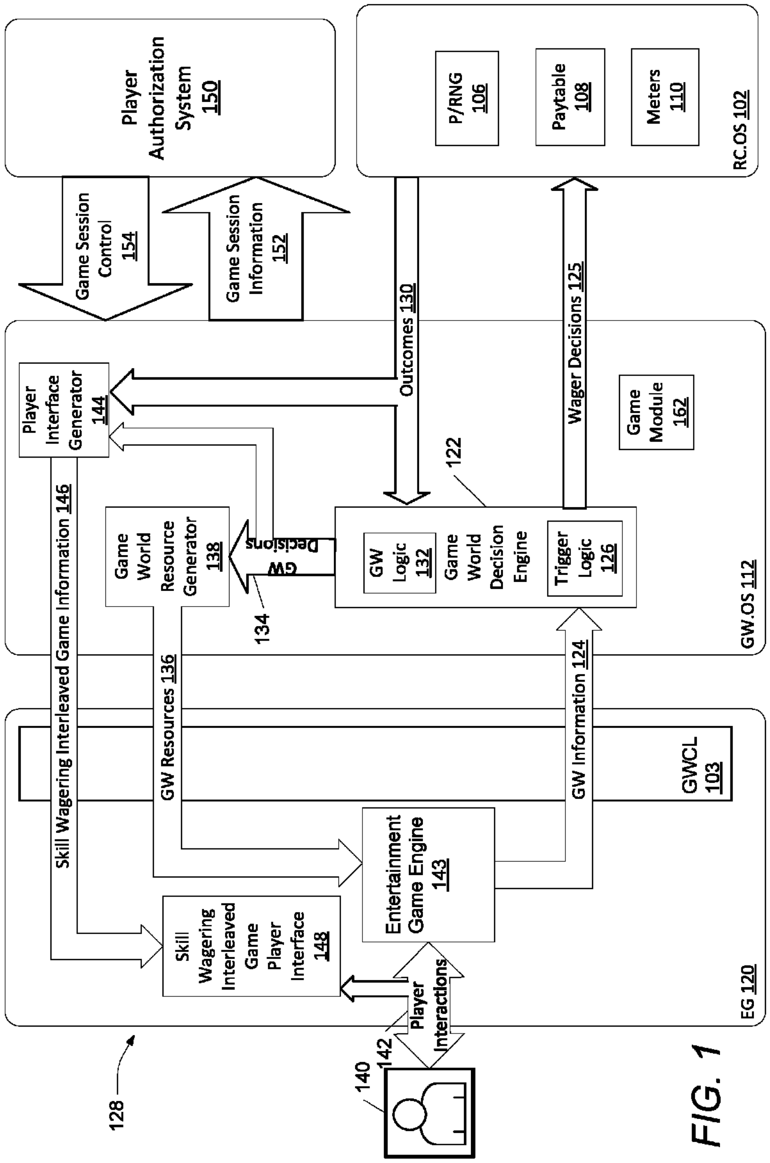
FIG. 1 illustrates a skill wagering interleaved game in accordance with an embodiment of the invention.

Turning now to the drawings, systems and methods for operation of skill wagering interleaved games, including a user interface manager, are illustrated. In several embodiments, a skill wagering interleaved game is a form of a combined skill and wagering game that integrates both a gambling proposition that includes a real world operating system (RC.OS), which manages the gambling proposition, as well as a skill-based entertainment game (Eg) coupled to the RC.OS by a game world operating system (GW.OS), which manages the configuration of the skill wagering interleaved game including an entertainment game. The Eg executes the skill-based components of the skill wagering interleaved game including an entertainment game for user entertainment. In certain embodiments, the skill wagering interleaved game also includes a player interface associated with either or both the gambling proposition and the entertainment game. A player of a skill wagering interleaved game is the electronic representation of interactions, typically via a player interface, and associated with a player profile of the skill wagering interleaved game. In operation of a skill wagering interleaved game, a player acts upon various types of elements of the entertainment game in a game world environment.

In many embodiments, elements are a limited resource consumed within an entertainment game to advance entertainment game gameplay. In playing the entertainment game using the elements, a player can (optionally) consume and accrue game world credits (GWCs) within the entertainment game. These credits can be in the form of (but are not limited to) game world credits, experience points, or points generally. Wagers made in accordance with a gambling proposition of a gambling game can be triggered by the player's use of one or more elements of the entertainment game. The wagers are made using real world credits (RCs). RC can be credits in an actual currency, or can be credits in a virtual currency which has real world value. Gambling outcomes in accordance with the gambling proposition can cause consumption, loss or accrual of RCs. In addition, gambling outcomes can influence elements in the entertainment game such as (but not limited to) by restoring a consumed element, causing the loss of an element, restoration or placement of a fixed element. In certain embodiments, a gambling proposition may facilitate wagering of GWCs for a randomly generated payout of GWCs or a wager of elements for a randomly generated payout of elements. In particular embodiments, an amount of GWCs and/or elements used as part of a wager can have a real world credit (RC) value if cashed out of a skill wagering interleaved game gameplay session.

Example elements include enabling elements (EE), which are elements that enable a player's play of the entertainment game and the consumption of which by the player while playing the entertainment game can trigger a wager in accordance with a gambling proposition. Another non-limiting example of an element is a reserve enabling element (REE), which is an element that converts into one or more enabling elements upon occurrence of a release event in skill wagering interleaved game gameplay. Other types of elements include actionable elements (AE), which are elements that are acted upon to trigger a wager in accordance with a gambling proposition and may or may not be restorable during normal play of the entertainment game. Another type of element is a common enabling element (CEE), which as an element that may be shared by two or more players and the use of which by any of the players causes a wager to be triggered.

In progressing through entertainment game gameplay, elements can be utilized by a player during interactions with a controlled entity (CE) which is a character, entity, inanimate object, device, or other object under control of a player.

Also, entertainment game gameplay progress and wager triggers can be dependent upon a game world variable such as, but not limited to: a required game object (RGO), which is a specific game object in an entertainment game acted upon for an AE to be completed (such as but not limited to a specific key needed to open a door); a required environmental condition (REC), which is a game state present within an entertainment game for an AE to be completed (such as but not limited to daylight, the presence of which enables a character to walk through woods); or a controlled entity characteristic (CEC), which is a status of the CE within an entertainment game for an AE to be completed (such as, but not limited to, a CE to have full health points before entering battle). Although various gameplay or game world resources, such as, but not limited to, GWCs, RCs, and elements as discussed above, any gameplay resource can be utilized to advance skill wagering interleaved game gameplay as well as form the basis for a trigger of a wager as appropriate to the specification of a specific application in accordance with various embodiments of the invention.

In many embodiments, a skill wagering interleaved game integrates the skill wagering interleaved game with a gambling game. In several embodiments, a skill wagering interleaved game can utilize a GW.OS to monitor skill wagering interleaved game entertainment game gameplay executed by an Eg for a gambling event occurrence. The gambling event occurrence can be detected from the skillful execution of the skill wagering interleaved game entertainment game in accordance with at least one gambling event occurrence rule. The gambling event occurrence can be communicated to a RC.OS, where the gambling event occurrence triggers a RC wager made in accordance with a wager trigger rule within the gambling proposition executed by the RC.OS. The wager can produce a wager payout as a randomly generated payout of both RC and gameplay resources. In addition, a skill wagering interleaved game entertainment game gameplay modification can be generated by the GW.OS that can be used to modify skill wagering interleaved game entertainment game gameplay executed by the Eg based upon the wager payout. In various embodiments, skill wagering interleaved game entertainment game gameplay can advance through the performance of skill wagering interleaved game player actions, where a skill wagering interleaved game player action is an action during skill wagering interleaved game gameplay that can be performed by a player or to a player.

In several embodiments, a gambling event occurrence can be determined from one or more game world variables within a skill wagering interleaved game entertainment game that are used to trigger a wager in accordance with a gambling proposition. Game world variables can include, but are not limited to, passage of a period of time during skill wagering interleaved game entertainment game gameplay, a result from a skill wagering interleaved game entertainment game gameplay session (such as, but not limited to, achieving a goal or a particular score), a player action that is a consumption of an element, or a player action that achieves a combination of elements to be associated with a player profile.

In numerous embodiments, an entertainment game modification is an instruction of how to modify skill wagering interleaved game entertainment game gameplay resources based upon one or more of a gambling proposition payout and game world variables. An entertainment game modification can modify any aspect of a skill wagering interleaved game entertainment game, such as but is not limited to an addition of a period of time available for a current skill wagering interleaved game entertainment game gameplay session, an addition of a period of time available for a future skill wagering interleaved game entertainment game gameplay session or any other modification to elements that can be utilized in skill wagering interleaved game entertainment game gameplay. In certain embodiments, an entertainment game modification can modify a type of element, the consumption of which triggers a gambling event occurrence. In particular embodiments, an entertainment game modification can modify a type of element, the consumption of which is not required in a gambling event occurrence.

In a number of embodiments, a player interface can be utilized that depicts a status of the skill wagering interleaved game entertainment game. The player interface can depict any aspect of a skill wagering interleaved game entertainment game including, but not limited to, an illustration of skill wagering interleaved game entertainment game gameplay advancement as a player plays the skill wagering interleaved game.

In some embodiments, a player authorization system 150 is used to authorize a skill wagering interleaved game gaming session. The player authorization system 150 receives game session information 152 that may include, but is not limited to, player, Eg, GW.OS, and RC.OS information from the GW.OS 112. The player authorization system 150 uses the player, Eg, GW.OS, and RC.OS information to regulate a skill wagering interleaved game gaming session. In some embodiments, the player authorization system 150 may also assert control of a skill wagering interleaved game game session 154. Such control may include, but is not limited to, ending a skill wagering interleaved game game session, initiating gambling in a skill wagering interleaved game game session, ending gambling in skill wagering interleaved game game session but not ending a player's play of the entertainment game portion of the skill wagering interleaved game game session, and changing from real credit wagering in a skill wagering interleaved game to virtual credit wagering, or vice versa.

Skill Wagering Interleaved Games Including a User Interface Manager

In many embodiments, a skill wagering interleaved game integrates high-levels of entertainment content with a game of skill (skill wagering interleaved game entertainment game) and a gambling experience with a game of chance (gambling proposition). A skill wagering interleaved game provides for random gambling outcomes independent of player skill, while providing that the user's gaming experience (as measured by obstacles/challenges encountered, time of play, and other factors) is shaped by the player's skill. A skill wagering interleaved game in accordance with an embodiment of the invention is illustrated in FIG. 1. The skill wagering interleaved game 128 includes an RC.OS 102, and a GW.OS 112. The RC.OS 102 is connected with the GW.OS 112. The Eg 120 is also connected with the GW.OS 112.

In many embodiments, the Eg 120 includes a skill wagering interleaved game module 160 that implements one or more features of a skill wagering interleaved game as described herein.

In several embodiments, the RC.OS 102 is an operating system for the gambling game of the skill wagering interleaved game 128 and controls and operates the gambling game. The operation of a gambling game is dependent upon a real credit or a virtual credit, such as money, other real world funds or virtual credits purchased for value. A gambling game can increase or decrease an amount of RCs based on random gambling outcomes, where a gambling proposition of a gambling game is typically regulated by gaming control bodies. In many embodiments, the RC.OS 102 includes a, pseudo random or random number generator (P/RNG) 106, one or more real-world credit pay tables 108, RC meters 110, and other software constructs that enable a game of chance to offer a fair and transparent gambling proposition, and the auditable systems and functions that can enable the game to obtain gaming regulatory body approval.

P/RNG 106 includes software and/or hardware and/or processes, which are used to generate random or pseudo random outcomes. The one or more pay tables 108 are tables that can be used in conjunction with P/RNG 106 to determine an amount of real world credits (RCs) earned as a function of skill wagering interleaved game gameplay and are analogous to the pay tables used in a conventional slot machine. There can be one or a plurality of pay tables 108 in the RC.OS 102 and used to implement one or more gambling games, the selection of which can be determined by factors including (but not limited to) game progress a player has earned, and/or bonus rounds for which a player can be eligible. RCs are credits analogous to slot machine game credits, which are entered into a skill wagering interleaved game by the user, either in the form of money such as hard currency or electronic funds. RCs can be decremented or augmented based on the outcome of the P/RNG 106 according to the pay table 108, independent of player skill. In certain embodiments, an amount of RCs can be used as criteria in order to enter higher skill wagering interleaved game entertainment game levels. RCs can be carried forward to higher game levels or paid out if a cash out is opted for by a player. The amount of RCs used to enter a specific level of the game level n need not be the same for each level.

In many embodiments, the RC.OS includes a skill wagering interleaved game module 164 that implements one or more features of a skill wagering interleaved game as described herein.

In many embodiments, the GW.OS 112 manages the overall skill wagering interleaved game operation, with the RC.OS 102 and the Eg 120 being support units to the GW.OS 112. In several embodiments, the GW.OS 112 may include mechanical, electronic, and software systems for a skill wagering interleaved game entertainment game. The GW.OS 112 provides an interface between skill wagering interleaved game entertainment game 120 and the skill wagering interleaved game RC.OS 102. The GW.OS 112 includes a game world decision engine 122 that receives game world information 124 from the Eg 120. The game world decision engine 122 uses the game world information, along with trigger logic 126 to make wagering decisions 125 about triggering a wager of RC in the RC.OS 102. The game world information 124 includes, but is not limited to, game world variables from the Eg 120 that indicate the state of the Eg 120 and the entertainment game that is being played by a player 140 and player actions and interactions 142 between the player and a game engine 143 of the Eg 120. The wager information may include, but is not limited to, an amount of RCs to be wagered, a trigger of a wager in accordance with a gambling proposition of a gambling game, and a selection of a paytable 108 to be used for the wager.

In some embodiments, the game world decision engine also receives gambling outcomes 130 from the RC.OS 102. The game world decision engine 122 uses the gambling outcomes, in conjunction with a the game world information 124 and game world logic 132 to make game world decisions 134 about what kind of game world resources 136 are to be provided to the Eg 120. A game world resource generator 138 generates the game world resources based on the game world decisions made by the game world decision engine and communicates them to the Eg 120.

In various embodiments, the game world decision engine 122 also calculates how many GWCs to award to the player 140 based at least in part on the player's skillful execution of the entertainment game of the skill wagering interleaved game as determined from the game world information 124. In some embodiments, gambling outcomes 130 are also used to determine how many GWCs should be awarded to the player 140.

In some embodiments, the game world decisions 134 and gambling outcomes 130 are provided to a player interface generator 144. The player interface generator 144 receives the game world decisions 134 and gambling outcomes 130 and generates skill wagering interleaved game information 146 describing the state of the skill wagering interleaved game. The skill wagering interleaved game information 146 includes, but is not limited to, amounts of GWCs earned, lost or accumulated by the player 140 through skillful execution of the entertainment game and RC amounts won, lost or accumulated as determined from the gambling outcomes 130 and the RC meters 110.

The GW.OS 112 can further couple to the RC.OS 102 to determine the amount of RCs available on the game and other metrics of wagering on the gambling game (and potentially affect the amount of RCs in play on the RC.OS 102). The GW.OS 112 additionally may include various audit logs and activity meters. In some embodiments, the GW.OS 112 can also couple to a centralized server for exchanging various data related to the player 140 and their activities on the game. The GW.OS 112 furthermore couples to the Eg 120.*s*

In several embodiments, GWCs are player points earned or depleted as a function of player skill, specifically as a function of player performance in the context of the game. GWCs may be analogous to the score in a typical video game. A skill wagering interleaved game entertainment game can have one or more scoring criteria, embedded within the GW.OS 112 or the Eg 120 that reflect player performance against the goal(s) of the skill wagering interleaved game entertainment game. In some embodiments, GWCs can be carried forward from one level of sponsored gameplay to another. In many embodiments, GWCs can be used within the Eg 120 to purchase in game items including, but not limited to, elements that have particular properties, power ups or the like. In other embodiments, GWCs may be used to earn entrance into a sweepstakes drawing, or earning participation in, or victory in, a tournament with prizes. In many embodiments, GWCs can be stored on a player tracking card or in a network-based player tracking system, where the GWCs are attributed to a specific player.

In certain embodiments, the operation of the GW.OS 112 does not affect the gambling operation of the RC.OS 102, except for player choice parameters that are allowable in slot machines including, but not limited to, wager terms such as, but not limited to, a wager amount, how fast the player wants to play (by pressing a button or pulling the handle of a slot machine), and/or agreement to wager into a bonus round. In this sense, the RC.OS 102 provides a fair and transparent, non-skill based gambling proposition co-processor to the GW.OS 112. In the illustrated embodiment, the transfer of game world information 124 shown between the GW.OS 112 and the RC.OS 102 allows the GW.OS 112 to obtain information from the RC.OS 102 as to the amount of RCs available in the gambling game. In various embodiments, the communication links can also convey a status operation of the RC.OS 102 (such as on-line or tilt). In numerous embodiments the communication links can further communicate the various gambling control factors, which the RC.OS 102 uses as input, such as the number of RCs consumed per game or the player's election to enter a jackpot round. In FIG. 1, the GW.OS 112 is also shown as connecting to the player's player interface directly, as this can be utilized to communicate certain skill wagering interleaved game entertainment game club points, player status, control the selection of choices, and messages that a player may find useful in order to adjust the a skill wagering interleaved game entertainment game experience, or understand their gambling status in the RC.OS 102.

In many embodiments, the GW.OS 112 includes a skill wagering interleaved game module 162 that implements one or more features of a skill wagering interleaved game as described herein.

In various embodiments, the Eg 120 manages and controls the visual, audio, and player control for the skill wagering interleaved game entertainment game. In certain embodiments, the Eg 120 accepts input from the player 140 through a set of hand controls, and/or head, gesture, and/or eye tracking systems and outputs video, audio, and/or other sensory output to a player interface. In many embodiments, the Eg 120 can exchange data with and accept control information from the GW.OS 112. In several embodiments an Eg 120 can be implemented using a casino gaming device such as a cabinet based casino game, a personal computer (PC), a Sony PlayStation® (a video game console developed by Sony Computer Entertainment of Tokyo Japan), or Microsoft Xbox® (a video game console developed by Microsoft Corporation of Redmond, Wash.) running a specific entertainment game software program. In numerous embodiments, an Eg can be an electromechanical game system of a skill wagering interleaved game that is an electromechanical skill wagering interleaved game. An electromechanical skill wagering interleaved game executes an electromechanical game for player entertainment. The electromechanical game can be any game that utilizes both mechanical and electrical components, where the game operates as a combination of mechanical motions performed by at least one player or the electromechanical game itself.

The Eg 120 operates mostly independently from the GW.OS 112, except that, via the transfer of game world resources 136, the GW.OS 112 can send certain skill wagering interleaved game entertainment game resources including control parameters to the Eg 120 to affect the execution of the Eg 120, such as (but not limited to) changing the difficulty level of the game. In various embodiments, these entertainment game control parameters can be based on a gambling outcome of a gambling game that was triggered by an element in the skill wagering interleaved game entertainment game being acted upon by the player. The Eg 120 can accept this input from the GW.OS 112, make adjustments, and continue skill wagering interleaved game entertainment game gameplay.

Execution of the Eg 120 is mostly skill-based, except for where the processes of the Eg 120 can inject complexities into the game by chance in its normal operation to create unpredictability in the skill wagering interleaved game entertainment game. The Eg 120 can also communicate player choices made in the game to the GW.OS 112, included in the game world information 124, such as, but not limited to, the player's utilization of the elements of the Eg 120 during the player's skillful execution of the Eg 120. The GW.OS 112 operates in this architecture, being interfaced thusly to the Eg 120, to allow the transparent coupling of an skill wagering interleaved game entertainment game to a fair and transparent random chance gambling game, providing a seamless perspective to the player 140 that they are playing a typical popular skill wagering interleaved game entertainment game (which is skill based).

In several embodiments, the RC.OS 102 can accept a trigger to run a gambling game in response to actions taken by the player 140 in the skill wagering interleaved game entertainment game as conveyed by the Eg 120 to the GW.OS 112 as triggered by the GW.OS 112 using trigger logic 126, background to the overall skill wagering interleaved game from the player's perspective, but can provide information to the GW.OS 112 to expose the player 140 to certain aspects of the gambling game, such as (but not limited to) odds, amount of RCs in play, and amount of RCs available. In various embodiments, the RC.OS 102 can accept modifications in the amount of RCs wagered on each individual gambling attempt, or the number of gambling games per minute the RC.OS 102 can execute, entrance into a bonus round, and other factors, all the while these factors can take a different form than that of a typical slot machine.

An example of a varying wager amount that the player can choose can include but is not limited to gameplay using a more difficult Eg level. These choices can increase or decrease the amount wagered per individual gambling game, in the same manner that a standard slot machine player can decide to wager more or fewer credits for each pull of the handle. In several embodiments, the RC.OS 102 can communicate a number of factors back and forth to the GW.OS 112, via an interface, such that an increase/decrease in a wagered amount can be related to the player's decision making as to their player profile in the skill wagering interleaved game entertainment game. In this manner, a player can be in control of a per game wager amount, with the choice mapping to a parameter or component that is applicable to the skill wagering interleaved game entertainment game experience.

In many embodiments, a skill wagering interleaved game integrates a video game style gambling machine, where the gambling game (including an RC.OS 102 and RCs) is not player skill based, while at the same time allows players to use their skills to earn club points which a casino operator can translate to rewards, tournament opportunities and prizes for the players. The actual exchange of monetary funds earned or lost directly from gambling against a game of chance in a gambling game, such as a slot machine, is preserved. At the same time a rich environment of rewards to stimulate gamers can be established with the entertainment game. In several embodiments, the skill wagering interleaved game can leverage popular titles with gamers and provides a sea change environment for casinos to attract players with games that are more akin to the type of entertainment that a younger generation desires. In various embodiments, players can apply their skill towards building and banking GWCs that in turn can be used to win tournaments and various prizes as a function of their gamer prowess. Numerous embodiments minimize the underlying changes applied to the aforementioned entertainment software for the skill wagering interleaved game to operate within a skill wagering interleaved game entertainment game construct. Therefore, a plethora of complex game titles and environments can be rapidly and inexpensively to deployed in a gambling environment.

In certain embodiments, skill wagering interleaved games also allow players to gain entry into subsequent competitions through the accumulation of GWCs as a function of the user's demonstrated skill at the game. These competitions can pit individual players or groups of players against one another and/or against the operator of a gambling game (such as, but not limited to, a casino) to win prizes based upon a combination of chance and skill. These competitions can be either asynchronous events, whereby players participate at a time and/or place of their choosing, or they can be synchronized events, whereby players participate at a specific time and/or venue.

In many embodiments, one or more players can be engaged in playing a skill based skill wagering interleaved game entertainment game executed by the Eg 120. A skill wagering interleaved game can include an entertainment game that includes head-to-head play between a single player and the computer, between two or more players against one another, or multiple players playing against the computer and/or each other, as well as a process by which player can bet on the outcome of an skill wagering interleaved game entertainment game. The skill wagering interleaved game entertainment game can also be a game where the player is not playing against the computer or any other player, such as in games where the player is effectively playing against himself or herself.

Figure 2:
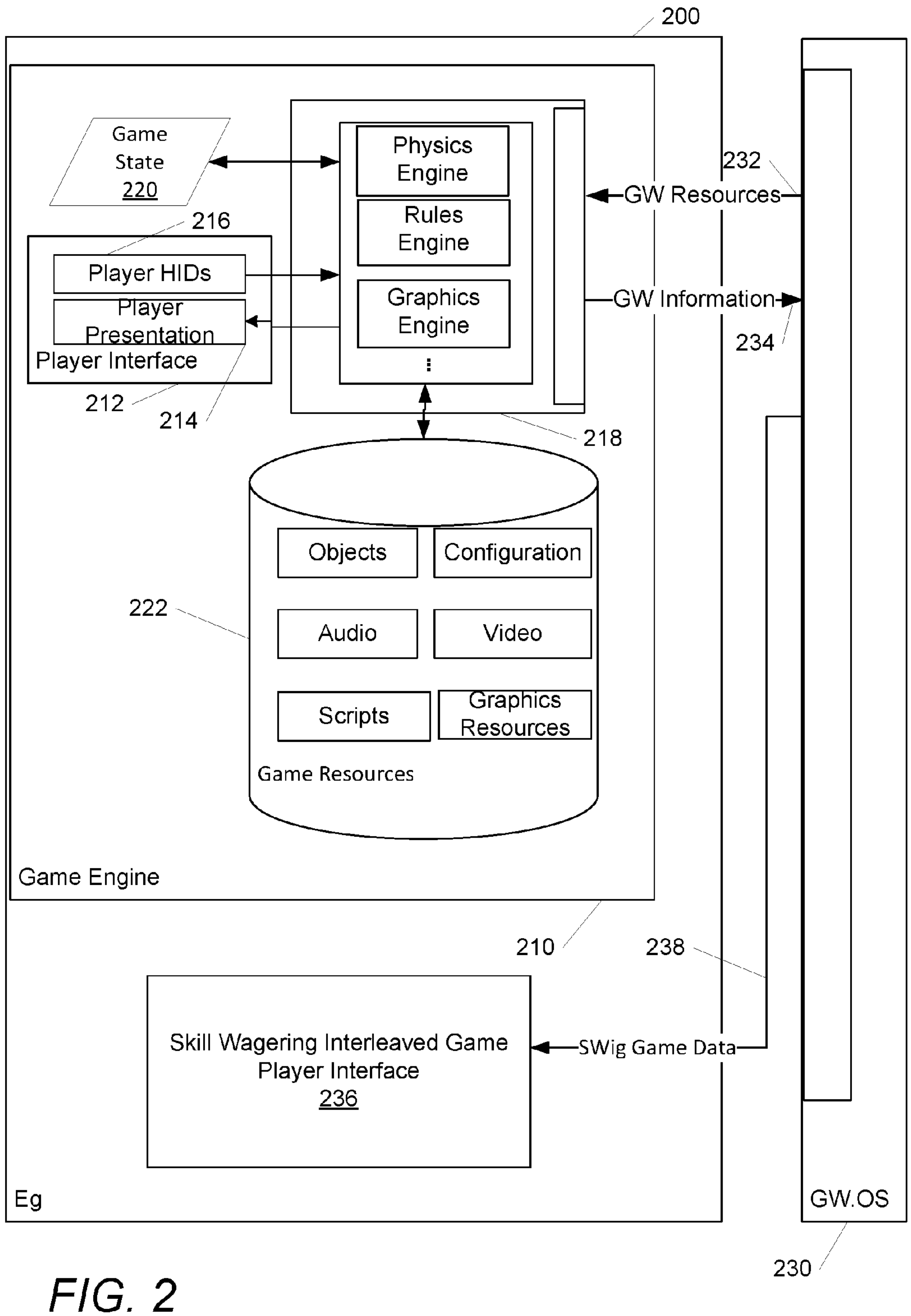
FIG. 2 illustrates an entertainment game in accordance with embodiments of the invention.

FIG. 2 is a diagram of an Eg in accordance with an embodiment of the invention. The Eg 200 may be part of the entertainment game itself, may be a software module that is executed by the entertainment game, or may provide an execution environment for the entertainment game for a particular host. The Eg 200 and an associated entertainment game are hosted by an Eg device. The Eg device is a computing device that is capable of hosting the Eg 200. Embodiments of devices include, but are not limited to, electronic gaming machines, video game consoles, smart phones, personal computers, tablet computers, or the like. In several embodiments, an Eg 200 of a skill wagering interleaved game includes a game engine 210 that generates a player interface 212 for interaction with by a player. The player interface 212 includes a player presentation 214 that is presented to a player through the player interface 212. The player presentation 214 may be audio, visual or tactile, or any combination of such. The player interface 212 further includes one or more human input devices (HIDs) 216 that the player uses to interact with the skill wagering interleaved game. Various components or sub-engines 218 of the game engine read data from a game state 220 in order to implement the features of the Eg 200. In some embodiments, components of the game engine include, but are not limited to, a physics engine used to simulate physical interactions between virtual objects in the game state, a rules engine for implementing the rules of the Eg 200, an RNG that may be used for influencing or determining certain variables and/or outcomes to provide a randomizing influence on game play, a graphics engine used to generate a visual representation of the game state to the player, and an audio engine to generate audio outputs for the player interface.

During operation, the game engine 210 reads and writes game resources 222 stored on a data store of the Eg host. The game resources include game objects having graphics and/or control logic used to implement game world objects of the Eg 200. In various embodiments, the game resources may also include, but are not limited to, video files that are used to generate cut-scenes for the Eg 200, audio files used to generate music, sound effects, etc., within the Eg 200, configuration files used to configure the features of the Eg 200, scripts or other types of control code used to implement various game play features of the Eg 200, and graphics resources such as textures, objects, etc., that are used by the game engine 210 to render objects displayed in the Eg 200.

In operation, components of the game engine 210 read portions of the game state and generate the player presentation for the player, which is presented to the player using the player interface 212. The player perceives the presentation and provides player inputs using the HIDs 216. The corresponding player inputs are received as player actions or inputs by various components of the game engine 210. The game engine 210 translates the player actions into interactions with the virtual objects of the game world stored in the game state. Components of the game engine 210 use the player interactions with the virtual objects of the entertainment game and the entertainment game state to update the game state and update the presentation presented to the user. The process loops in a game loop continuously while the player plays the skill wagering interleaved game.

In some embodiments, the Eg 200 is a host running a browser that communicates with a server serving documents in a markup language, such as Hypertext Markup Language 5 (HTML 5) or the like, and the functions of the game engine are performed by the browser on the basis of the markup language found in the documents. In some embodiments, the Eg 200 is a host hosting a specialized software platform, such as Adobe Flash or the like, used to implement games or other types of multimedia presentations, and the functions of the game engine are performed by the specialized platform.

The Eg 200 includes one or more interfaces between an Eg 200 and other components of a skill wagering interleaved game, such as a GW.OS 230. The Eg 200 and the other skill wagering interleaved game components communicate with each other using the interfaces, such as by passing various types of data and sending and receiving messages, status information, commands and the like. In certain embodiments, the Eg 200 and GW.OS 230 exchange game world resources 232 and game world information 234. In some embodiments, the communications include requests by the GW.OS 230 that the Eg 200 update the game state 220 using information provided by the GW.OS 230. Another embodiment of a communication is requesting by the GW.OS 230 that the Eg 200 update one or more game resources using information provided by the GW.OS 230. In another embodiment, communication is provided by the Eg 200 of all or a portion of the game state. In some embodiments, Eg 200 may also provide one or more of the game resources to the GW.OS 230. In some embodiments, the communication includes player actions that the Eg 200 communicates to the GW.OS 230. The player actions may be low level player interactions with the player interface 212, such as manipulation of an HID 216, or may be high level interactions with objects as determined by the entertainment game. The player actions may also include resultant actions such as modifications to the skill wagering interleaved game state or game resources resulting from the player's actions taken in the skill wagering interleaved game. In some embodiments, player actions include, but are not limited to, actions taken by entities, such as non-payer characters (NPC) of the entertainment game, that act on behalf of, or under the control of, the player.

In some embodiments, the Eg 200 includes a skill wagering interleaved game player interface 236 used to communicate skill wagering interleaved game data 238 to and from the player. The skill wagering interleaved game data 238 includes, but is not limited to, information used by the player to configure gambling game RC wagers, and information about the gambling game RC wagers, such as RC balances and RC amounts wagered.

Figure 3A:
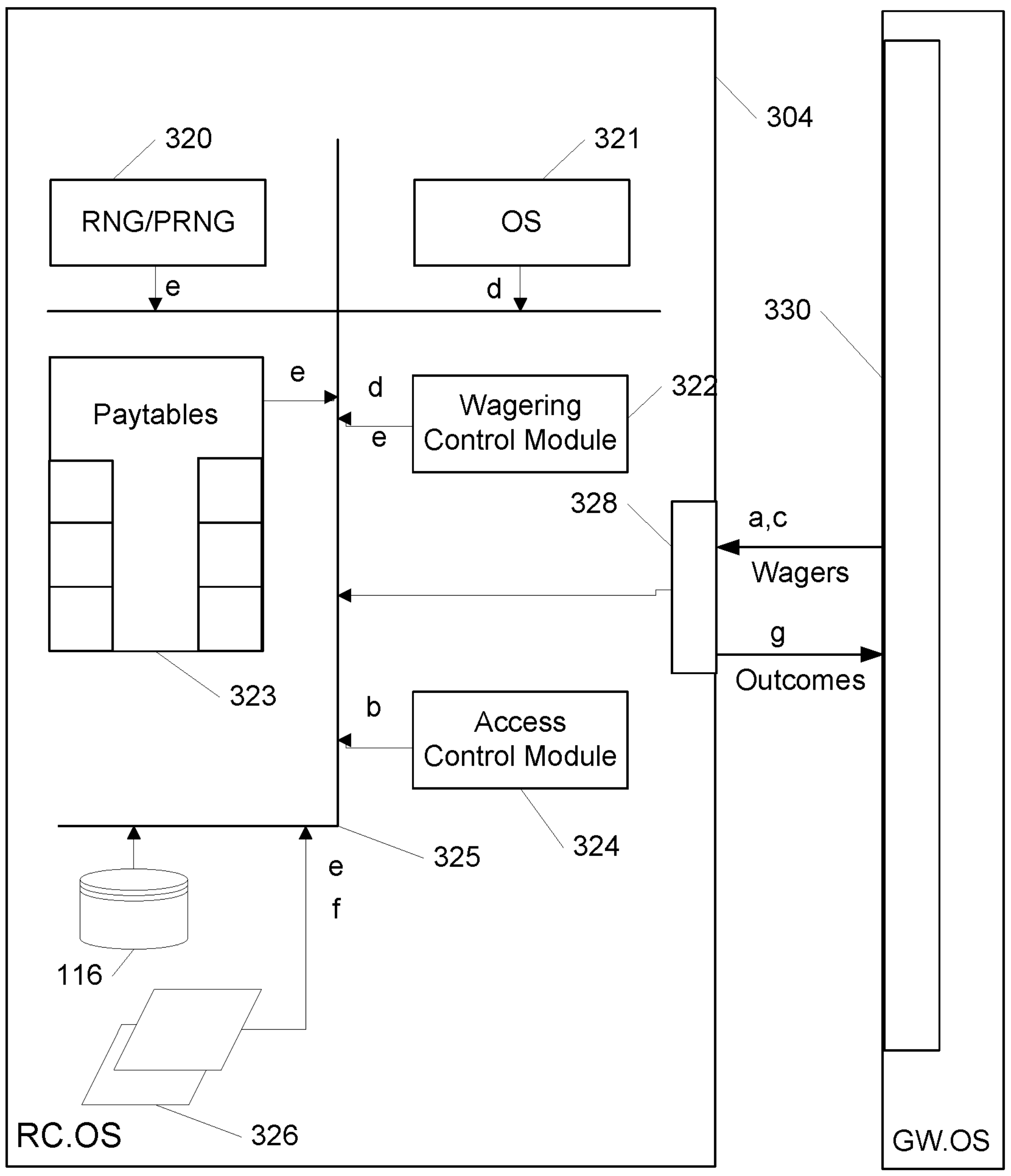
FIG. 3A illustrates a real credit operating system in accordance with embodiments of the invention.

FIG. 3A is an illustration of an RC.OS is accordance with an embodiment of the invention. In this embodiment, the RC.OS 304 has an operating system OS 321, which controls the functions of the RC.OS 304, a random number generator (RNG) 320 to produce random numbers or pseudo random numbers, one or more pay tables 323, which includes a plurality of factors indexed by the random number to be multiplied with an amount of RCs committed in a wager, a wagering control module 322 whose processes may include, but are not limited to, pulling random numbers, looking up factors in the pay tables, multiplying the factors by an amount of RC wagered, and administering one or more RC credit meters 326. The RC.OS 304 may also include storage for statuses, wagers, gambling outcomes, meters and other historical events in a storage device 316. An authorization access module 324 provides a process to permit access and command exchange with the RC.OS 304 and access to a repository (a credit meter) 326 for the amount of RCs that a player has deposited in the skill wagering interleaved game. An external interface 328 allows the RC.OS 304 to interface to another system or device, such as a GW.OS 330. Various RC.OS 304 modules and components interface with each other via an internal bus 325.

In various embodiments, an RC.OS 304 may use an RNG that is an external system, connected to the RC.OS 304 by local area network (LAN) or a wide area network (WAN) such as the Internet. In some embodiments, the external RNG is a central deterministic system, such as a regulated and controlled random numbered ball selection device, or some other system which provides random or pseudo random numbers to one or a plurality of connected RC.OSs.

In numerous embodiments, the method of interfacing an RC.OS 304 to other systems/devices or to an external RNG may be the Internet, but it should be noted that nothing would preclude using a different interface than the Internet in certain embodiments, such as a LAN, a USB interface, or some other method by which two electronic devices could communicate with each other.

In numerous embodiments, signaling occurs between various types of an RC.OS 304 and an external system, such as GW.OS 330. In some of these embodiments, the RC.OS 304 operates to manage wagering events and to provide random (or pseudo random) numbers from an RNG. The external system requesting wagering support instructs the RC.OS 304 as to the pay table to use, followed by the amount of RCs to wager. Next, the external system signals the RC.OS 304 to trigger a wager, followed by the RC.OS 304 informing the external system as to the outcome of the wager, the amount of RCs won, and lastly the amount of RCs in the player's account in the credit repository.

In various embodiments, a second communication exchange between various types of RC.OSs and an external system relates to the external system using an RNG result support from the RC.OS. In this exchange, the external system requests an RNG result from the RC.OS, and the RC.OS returns an RNG result, as a function of the RC.OS's internal RNG, or from an RNG external to the RC.OS to which the RC.OS is connected.

In some embodiments, communication exchange between various types of an RC.OS 304 and an external system relate to the external system wanting support on coupling an RNG result to a particular one of the pay tables 323 contained in the RC.OS 304. In such an exchange, the external system instructs the RC.OS 304 as to the pay table to use, and then requests a result whereby the RNG result would be coupled to the requested pay table, and this result would be returned to the external system. In such an exchange, no actual RC wager is conducted, but might be useful in coupling certain non-RC wagering entertainment game behaviors and propositions to the same final resultant wagering return which is understood for the skill wagering interleaved game to conduct wagering.

In numerous embodiments, some or all of the various commands and responses illustrated could be combined into one or more communication packets.

The following table illustrates a process for operation of the RC.OS 304, in accordance with various embodiments:

| SEQUENCE 1 - Place a Wager | |
|---|---|
| a | An external system signals the RC.OS 304 that it wishes to connect to the RC.OS 304 and forwards its credentials. |
| b | The access control module 324 of the RC.OS 304 determines that the external system is safe to connect to and indicates so to the external system |
| c | The external system signals the RC.OS 304 that it wishes the RC.OS 304 to perform a wager and communicates which of the pay tables 323 to use, and the amount of RCs to wager and triggers the wager. |
| d | The OS 321 instructs the wager control module 322 as to the RC wager and which of the pay tables 323 to select, and to execute. |
| e | The wager control module 322 pulls: an RNG result from the RNG 320, a Pay Table result from the pay tables 323, RC from the RC repository 326 as instructed, and applies a random number to the particular one of the pay tables 323, and multiplies the resultant factor from the pay table by the amount of RCs to determine the result of the wager. |
| f | The amount of RCs won in the wager is added to the RC repository 326. |
| g | The outcome of the wager, and the amount of RCs in the RC.OS 304 and the RCs won is communicated to the external system. |

It should be understood that there may be many embodiments of an RC.OS 304 that could be possible, including forms where many modules and components of the RC.OS 304 are located in various servers and locations, so the foregoing is not meant to be exhaustive or all inclusive, but rather provide information on various embodiments of an RC.OS 304.

Figure 3B:
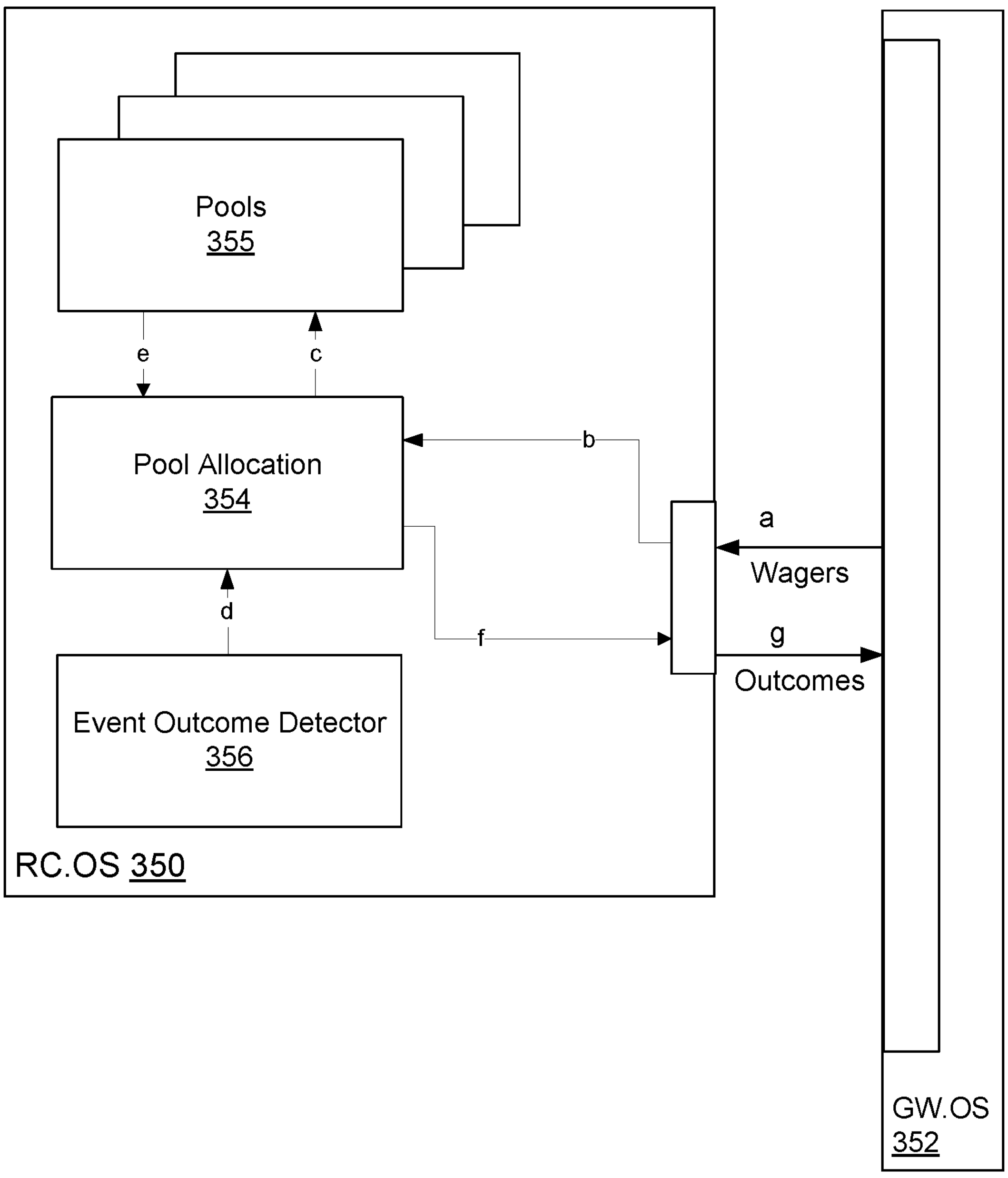
FIG. 3B is an illustration of a pari-mutuel-based real credit operating system in accordance with embodiments of the invention.

FIG. 3B is an illustration of an RC.OS is accordance with an embodiment of the invention. In this embodiment, the RC.OS 350 is a pari-mutuel wagering system such as used for wagering on horse races, greyhound races, sporting events and the like. In a pari-mutuel wagering system, player's wagers on the outcome of an event, such as a horse race or the like, are allocated to a pool. When the event occurs, gambling outcomes are calculated by sharing the pool among all winning wagers.

In numerous embodiments, signaling occurs between various types of an RC.OS 350 and an external system, such as GW.OS 352. In some of these embodiments, the RC.OS 350 operates to allocate (354) wagers to pools 355, detect occurrences (356) of one or more events upon which the wagers were made, and determine the gambling outcomes for each individual wager based on the number of winning wagers and the amount paid into the pool. In some embodiments, the RC.OS manages accounts for individual players wherein the players make real world credit deposits into the accounts, amounts of real world credit wagers are deducted from the accounts, and real world credits are credited to the players' accounts based on the gambling outcomes.

In numerous embodiments, some or all of the various commands and responses illustrated herein could be combined into one or more communication packets.

The following table illustrates a process for operation of the RC.OS 350 in accordance with various embodiments:

| SEQUENCE 1 - Place a Wager | |
|---|---|
| a | An external system, such as GW.OS 352, signals the RC.OS 350 that the external system wishes the RC.OS 350 to accept a wager and communicates wager information including, but not limited to, an identifier of a player, a type of wager to be made and an amount of RC to wager. |
| b and c | The RC.OS 350 receives the wagering information and allocates the amount of RCs of the wager to an appropriate pool with the RC amounts of one or more other wagers for the same type of wager. |
| d | The RC.OS 350 detects when the occurrence of one or more events upon which the wagers were made. |
| e, f and g | The RC.OS 350 determines gambling outcomes for each wager in the pool by determining which wagers were winning wagers and which wagers were losing wagers. The RC.OS 350 allocates the pooled RC amounts to the winning wagers and then communicates the gambling outcomes to the external system. |

It should be understood that there may be many embodiments of an RC.OS 350 which could be possible, including forms where many modules and components of the RC.OS are located in various servers and locations, so the foregoing is not meant to be exhaustive or all inclusive, but rather provide information on various embodiments of an RC.OS 350.

Figure 4:
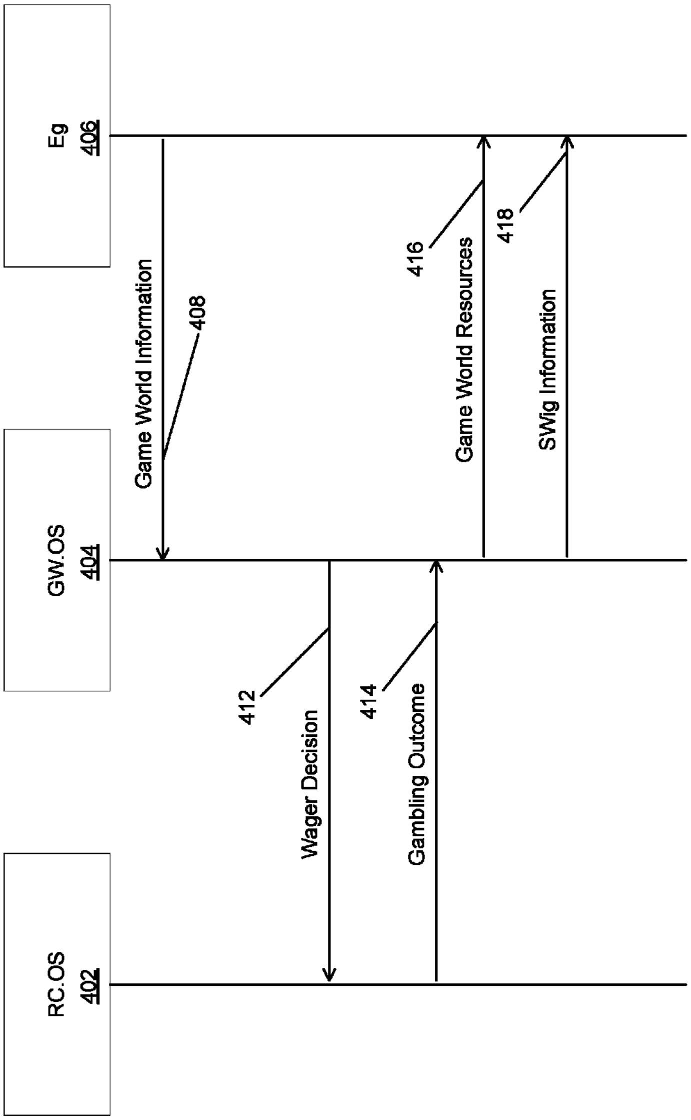
FIG. 4 is a timing diagram that illustrates a process of facilitating interactions between a skill wagering interleaved game entertainment game and a skill wagering interleaved game in accordance with embodiments of the invention.
Figure 5A:
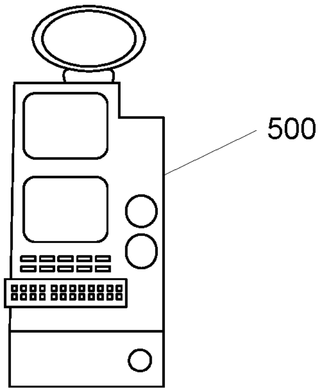
FIGS. 5A, 5B, 5C, and 5D illustrate various devices that host a skill wagering interleaved game in accordance with embodiments of the invention.
Figure 5B:
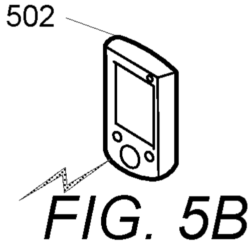
Figure 5C:
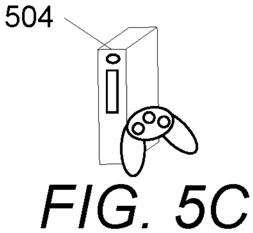
Figure 5D:
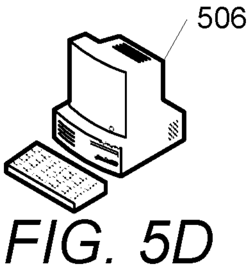

FIG. 4 is a timing diagram that illustrates a process of facilitating interactions between a skill wagering interleaved game entertainment game and a gambling game in accordance with embodiments of the invention. The process includes a player performing a player action using a player interface. An Eg 406 can provide a signal (408) to a GW.OS 404 including game world information, including but not limited to a player interaction the Eg 406. In some embodiments, the GW.OS 404 can provide a signal the Eg 406 as to the amount of EE that will be consumed by the player action in return. The signal can configure a function that controls EE consumption, decay, or addition for the Eg 406. The Eg 406 can, based upon the function, consume an amount of EE designated by the GW.OS 404 to couple to the activity. Upon detection that the player action is a gameplay gambling event, the GW.OS 404 can provide a signal to an RC.OS 402 as to the wager terms associated with the gameplay gambling event in a triggered (412) wager. The RC.OS 402 can consume RC in executing the wager. The RC.OS 402 can return RC as a payout from the wager. The RC.OS 402 can inform (414) the GW.OS 404 as to the gambling outcome such as a payout from the wager. The GW.OS 404 can provide a signal (416) to the Eg 406 to ascribe game world resources, such as a payout of EE based upon the wager. The Eg 406 can reconcile and combine the payout of EE with the EE already ascribed to the player in the skill wagering interleaved game entertainment game. In various embodiments, the Eg 406 can provide a signal to the GW.OS 404 as to the updated status of the Eg 406 based upon reconciling the payout of EE, and the GW.OS 404 can provide a signal to the Eg 406 of a payout of GWC in response to the status update. The GW.OS 404 also communicates to the Eg 406 skill wagering interleaved game (SWig) information 418 to the Eg 406 for display to, and interaction with, the player.

In certain embodiments, the sequence of events in the timing diagram of FIG. 4 can be reflected in an entertainment game of a skill wagering interleaved game. For example, a player can take an action, such as selecting a number to be placed in a section of a Sudoku board. The Eg 406 can provide a signal (408) to the GW.OS 404 of the player action, such as but not limited to signaling to the GW.OS 404 as to the player's choice of the symbol, the position on the Sudoku puzzle board that the symbol is played, and whether or not the symbol as played was a correct symbol in terms of eventually solving the Sudoku puzzle. The GW.OS 404 can process the information concerning the placement of the symbol, and signal (410) to the Eg 406 to consume a symbol (EE) with each placement. The entertainment game then will consume the number (EE) based upon the placement of the symbol. The GW.OS 404 can also provide a signal (412) to the RC.OS 402 that 3 credits of RC are to be wagered to match the placement of the symbol as (EE) that is consumed, on a particular pay table (table Ln-RC). The RC.OS 402 can consume the 3 credits for the wager and execute the specified wager. In executing the wager, the RC.OS 402 can determine that the player hits a jackpot of 6 credits, and allocate the 6 credits of RC to the credit meter. The RC.OS 402 can also inform (414) the GW.OS 404 that 6 credits of RC net were won as a payout from the wager. The GW.OS 404 can provide a signal (416) to the Eg 406 to add 2 additional symbols (EE) to the symbol of symbols available to a player based upon the gambling game payout. The Eg 406 can then add 2 symbols (EE) to the number of symbol placements available to a player in the skill wagering interleaved game entertainment game. The GW.OS 404 can receive (418) an update from the Eg 406 as to the total amount of EE associated with the player. The GW.OS 404 can log the new player score (GWC) in the game (as a function of the successful placement of the symbol) based on the update, and provide a signal (420) to the Eg 406 to add 2 extra points of GWC to the player's score.

In many embodiments, a player can bet on whether or not the player will beat another player. These bets can be made, for example, on the final outcome of the game, and/or the state of the game along various intermediary points (such as, but not limited to, the score at the end of a period of time of a skill wagering interleaved game entertainment game session) and/or on various measures associated with the game. Players can bet against one another, or engage the computer in a head to head competition in the context of their skill level in the skill wagering interleaved game entertainment game in question. As such, players can have a handicap associated with their player profile that describes their skill (which can be their professed skill in certain embodiments), and which is used by a GW.OS (such as a local GW.OS or a GW.OS that receives services from remote servers) to offer appropriate bets around the final and/or intermediate outcomes of the skill wagering interleaved game entertainment game, and/or to condition sponsored gameplay as a function of player skill, and/or to select players across one or more skill wagering interleaved games to participate in head to head games and/or tournaments.

Many embodiments enable the maximization of the number of players able to compete competitively by enabling handicapping of players by utilizing a skill normalization module that handicaps players to even the skill level of players competing against each other. Handicapping enables players of varying performance potential to compete competitively regardless of absolute skill level, such as, but not limited to, where a player whose skill level identifies the player as a beginner can compete in head to head or tournament play against a highly skilled player with meaningful results.

In several embodiments, wagers can be made among numerous skill wagering interleaved games with a global betting manager (GBM). The GBM is a system that coordinates wagers that are made across multiple skill wagering interleaved games by multiple players. In some embodiments, the GBM can also support wagers by third parties relative to the in game performance of other players. The GBM may be a standalone system, or may be embedded in one of a number of other systems, including a GW.OS, Eg, or any remote server capable of providing services to a skill wagering interleaved game, or can operate independently on one or a number of servers on-site at a casino, as part of a larger network and/or the Internet or cloud in general.

Although various components of skill wagering interleaved games are discussed above, skill wagering interleaved games can be configured with any component as appropriate to the specification of a specific application in accordance with embodiments of the invention. In certain embodiments, components of a skill wagering interleaved game, such as a GW.OS, RC.OS, or Eg can be configured in different ways for a specific skill wagering interleaved game gameplay application. Network connected skill wagering interleaved games are discussed below.

Stand-Alone Skill Wagering Interleaved Games

FIGS. 5A to 5D illustrate various types of devices that may be used to host a skill wagering interleaved game as stand-alone device in accordance with embodiments of the invention. An electronic gaming machine 500 may be used to host a skill wagering interleaved game. The electronic gaming machine 500 may be physically located in a casino or other gaming establishment. A portable device 502, such as tablet computer or a smartphone may be used to host a skill wagering interleaved game. A gaming console 504 may be used to host a skill wagering interleaved game. A personal computer 506 may be used to host a skill wagering interleaved game.

Network Connected Skill Wagering Interleaved Games

Some skill wagering interleaved games in accordance with many embodiments of the invention can operate locally while being network connected to draw services from remote locations or to communicate with other skill wagering interleaved games. In many embodiments, operations associated with a skill wagering interleaved game utilizing a skill wagering interleaved game entertainment game can be performed across multiple devices. These multiple devices can be implemented using a single server or a plurality of servers such that a skill wagering interleaved game is executed as a system in a virtualized space, such as (but not limited to) where the RC.OS and GW.OS are large scale centralized servers in the cloud coupled to a plurality of widely distributed Eg controllers or clients via the Internet.

In many embodiments, a RC.OS server can perform certain functionalities of a RC.OS of a skill wagering interleaved game. In certain embodiments, a RC.OS server includes a centralized odds engine, which can generate random outcomes (such as but not limited to win/loss outcomes) for a gambling game. The RC.OS server can perform a number of simultaneous or pseudo-simultaneous runs in order to generate random outcomes for a variety of odds percentages that one or more networked skill wagering interleaved games can use. In certain embodiments, an RC.OS of a skill wagering interleaved game can send information to a RC.OS server including (but not limited to) paytables, maximum speed of play for a gambling game, gambling game monetary denominations, or any promotional RC provided by the operator of the skill wagering interleaved game. In particular embodiments, a RC.OS server can send information to a RC.OS of a skill wagering interleaved game including (but not limited to) RC used in the gambling game, player profile information or play activity and a profile associated with a player.

In several embodiments, a GW.OS server can perform the functionality of the GW.OS across various skill wagering interleaved games. These functionalities can include (but are not limited to) providing a method for monitoring high scores on select groups of games, coordinating interactions between gameplay layers, linking groups of games in order to join them in head to head tournaments, and acting as a tournament manager.

In a variety of embodiments, management of player profile information can be performed by a patron management server separate from a GW.OS server. A patron management server can manage information related to a player profile, including (but not limited to) data concerning controlled entities (such as characters used by a player in skill wagering interleaved game entertainment game gameplay), game scores, elements, RC, and GWC associated with particular players and managing tournament reservations. Although a patron management server is discussed as being separate from a GW.OS server, in certain embodiments a GW.OS server also performs the functions of a patron management server. In certain embodiments, a GW.OS of a skill wagering interleaved game can send information to a patron management server including (but not limited to) GWC and RC used in a game, player profile information, play activity, synchronization information between a gambling game and a skill wagering interleaved game entertainment game, or other aspects of a skill wagering interleaved game. In particular embodiments, a patron management server can send information to a GW.OS of a skill wagering interleaved game including (but not limited to) skill wagering interleaved game entertainment game title and type, tournament information, table Ln-GWC tables, special offers, character or profile setup, synchronization information between a gambling game and an skill wagering interleaved game entertainment game, or other aspects of a skill wagering interleaved game.

In numerous embodiments, an Eg server provides a host for managing head to head play, operating on the network of Egs which are connected to the Eg server by providing an environment where players can compete directly with one another and interact with other players. Although an Eg server is discussed as being separate from a GW.OS server, in certain embodiments the functionalities of an Eg server and GW.OS server can be combined in a single server.

Servers connected via a network to implement skill wagering interleaved games in accordance with many embodiments of the invention can communicate with each other to provide services utilized by a skill wagering interleaved game. In several embodiments, a RC.OS server can communicate with a GW.OS server. A RC.OS server can communicate with a GW.OS server to communicate any type of information as appropriate for a specific application, including (but not limited to): information used to configure the various simultaneous or pseudo simultaneous odds engines executing in parallel within the RC.OS to accomplish skill wagering interleaved game system functionalities, information used to determine metrics of RC.OS performance such as random executions run and outcomes for tracking system performance, information used to perform audits, provide operator reports, and information used to request the results of a random run win/loss result for use of function operating within the GW.OS (such as where automatic drawings for prizes are a function of Eg performance).

In several embodiments a GW.OS server can communicate with an Eg server. A GW.OS server can communicate with an Eg server to communicate any type of information as appropriate for a specific application, including (but not limited to): the management of an Eg server by a GW.OS server during a skill wagering interleaved game tournament. Typically a GW.OS (such as a GW.OS that runs within a skill wagering interleaved game or on a GW.OS server) is not aware of the relationship between itself and the rest of a tournament, because in a typical configuration the actual tournament play is managed by the Eg server. Therefore, management of a skill wagering interleaved game tournament can include (but is not limited to) tasks such as: conducting tournaments according to system programming that can be coordinated by an operator of the skill wagering interleaved game; allowing entry of a particular player into a tournament; communicating the number of players in a tournament and the status of the tournament (such as but not limited to the amount of surviving players, their status within the game, time remaining on the tournament); communicating the performance of its players within the tournament; communicating the scores of the various members in the tournament; and providing a synchronizing link to connect the GW.OSs in a tournament with their respective Egs.

In several embodiments a GW.OS server can communicate with a patron management server. A GW.OS server can communicate with a patron management server to communicate any type of information as appropriate for a specific application, including (but not limited to) information for configuring tournaments according to system programming conducted by an operator of a skill wagering interleaved game, information for exchange of data used to link a player's player profile to their ability to participate in various forms of skill wagering interleaved game gameplay (such as, but not limited to, the difficulty of play set by the GW.OS server or the GW.OS), information for determining a player's ability to participate in a tournament as a function of a player's characteristics (such as, but not limited to, a player's gaming prowess or other metrics used for tournament screening), information for configuring GW.OS and Eg performance to suit preferences of a player on a particular skill wagering interleaved game, information for determining a player's play and gambling performance for the purposes of marketing intelligence, and information for logging secondary drawing awards, tournament prizes, RC, and GWC into the player profile.

In many embodiments, the actual location of where various process are executed can be located either in the game-contained devices (RC.OS, GW.OS, Eg), on the servers (RC.OS server, GW.OS server, or Eg server), or a combination of both game-contained devices and servers. In particular embodiments, certain functions of a RC.OS server, GW.OS server, patron management server, or Eg server can operate on the local RC.OS, GW.OS, or Eg contained with a skill wagering interleaved game locally. In certain embodiments, a server can be part of a server system including one or a plurality of servers, where software can be run on one or more physical devices. Similarly, in particular embodiments, multiple servers can be combined on a single physical device.

Figure 6A:
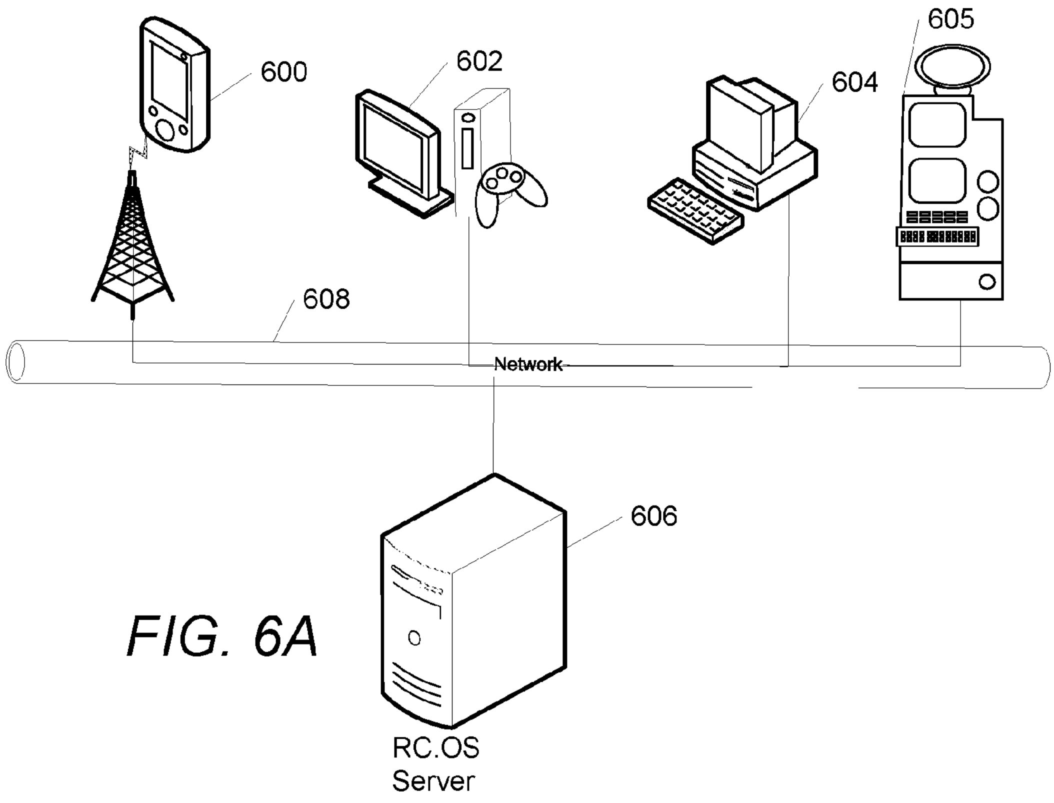
FIGS. 6A, 6B and 6C illustrate embodiments of a distributed skill wagering interleaved game in accordance with embodiments of the invention.

Some skill wagering interleaved games in accordance with many embodiments of the invention can be networked with remote servers in various configurations. Networked skill wagering interleaved game in accordance with embodiments of the invention are illustrated in FIG. 6A. As illustrated, one or more end devices of networked skill wagering interleaved games, such as a mobile device 600, a gaming console 602, a personal computer 604, and an electronic gaming machine 605, are connected with a RC.OS server 606 over a network, such as a LAN or a WAN, 608. In these embodiments, the processes of an Eg and a GW.OS as described herein are executed on the individual end devices 600, 602, 604, and 605 while the processes of the RC.OS as described herein are executed by the RC.OS server 606.

Figure 6B:
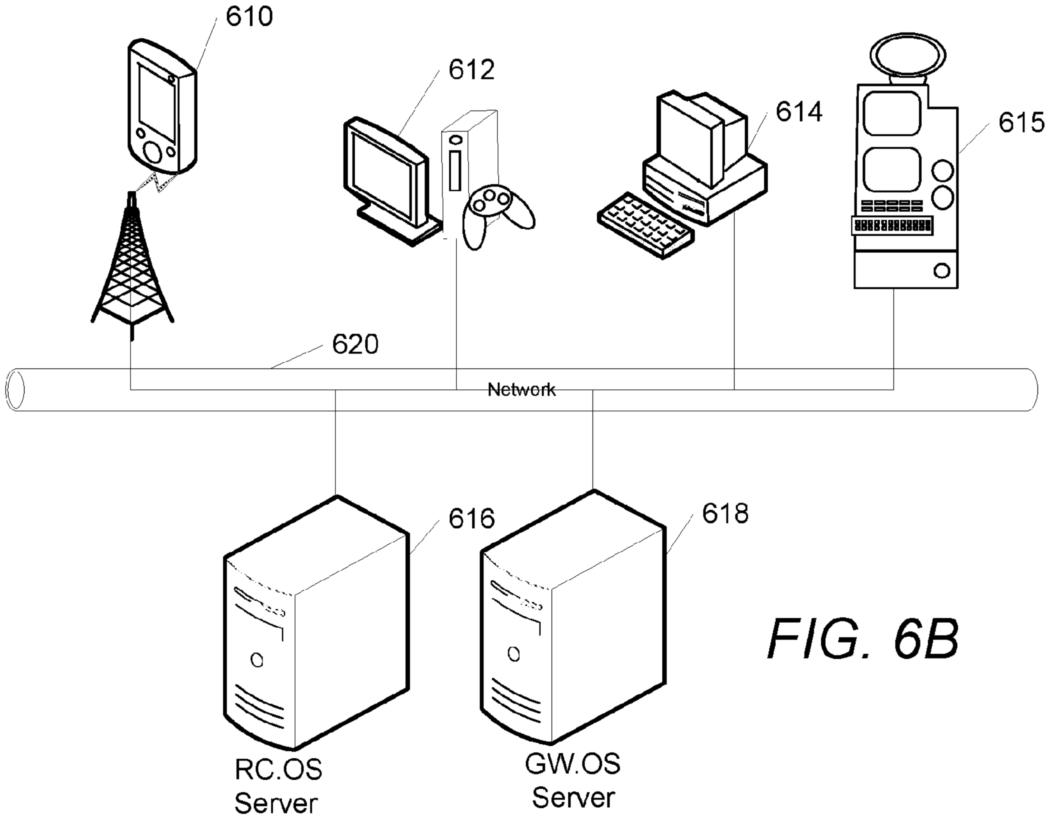

Other networked skill wagering interleaved games in accordance with embodiments of the invention are illustrated in FIG. 6B. As illustrated, one or more end devices of networked skill wagering interleaved games, such as a mobile device 610, a gaming console 612, a personal computer 614, and an electronic gaming machine 615, are connected with an RC.OS server 616 and a GW.OS server 618 over a network, such as a LAN or a WAN, 620. In these embodiments, the processes of an Eg as described herein are executed on the individual end devices 610, 612, 614, and 615, while the processes of the RC.OS as described herein are executed by the RC.OS server and the process of the GW.OS as described herein are executed by the GW.OS server.

Figure 6C:
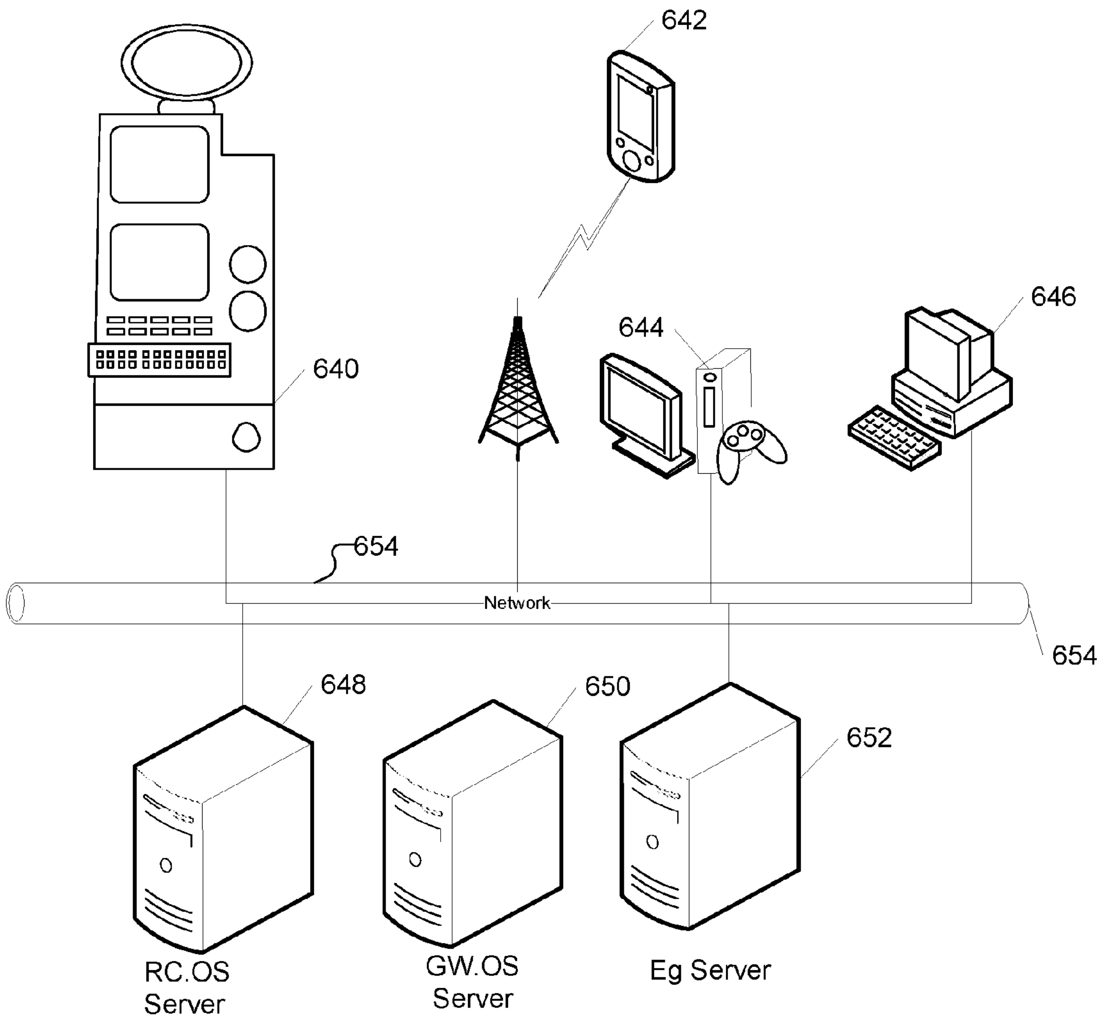

Additional networked skill wagering interleaved games in accordance with embodiments of the invention are illustrated in FIG. 6C. As illustrated, one or more end devices of networked skill wagering interleaved games, such as a mobile device 642, a gaming console 644, a personal computer 646, and an electronic gaming machine 640, are connected with an RC.OS server 648 and a GW.OS server 650, and an Eg server 652 over a network, such as a LAN or a WAN, 654. In these embodiments, the processes of a display and player interface of an Eg as described herein are executed on the individual end devices 640, 642, 644 and 646 while the processes of the RC.OS as described herein are executed by the RC.OS server, the processes of the GW.OS as described herein are executed by the GW.OS server, and the processes of an Eg excluding the display and player interfaces are executed on the Eg server 652.

In various embodiments, a patron management server may be operatively connected to components of a skill wagering interleaved game via a network. In other embodiments, a number of other peripheral systems, such as player management, casino management, regulatory, and hosting servers can also interface with the skill wagering interleaved games over a network within an operator's firewall. Also, other servers can reside outside the bounds of a network within an operator's firewall to provide additional services for network connected skill wagering interleaved games.

In numerous embodiments, a network distributed skill wagering interleaved game can be implemented on multiple different types of devices connected together over a network. Any type of device can be utilized in implementing a network distributed skill wagering interleaved game, such as, but not limited to, a gaming cabinet as used in a traditional land-based casino or a mobile computing device (such as, but not limited to, a PDA, smartphone, tablet computer, or laptop computer), a game console (such as, but not limited to, a Sony PlayStation®, or Microsoft Xbox®), or on a Personal Computer (PC). Each of the devices may be operatively connected to other devices or other systems of devices via a network for the playing of head-to-head games.

Although various networked skill wagering interleaved games are discussed above, skill wagering interleaved games can be networked in any configuration as appropriate to the specification of a specific application in accordance with embodiments of the invention. In certain embodiments, components of a networked skill wagering interleaved game, such as a GW.OS, RC.OS, Eg, or servers that perform services for a GW.OS, RC.OS, or Eg, can be networked in different configurations for a specific networked skill wagering interleaved game gameplay application. Processing apparatuses that can be implemented in a skill wagering interleaved game are discussed below.

Processing Apparatuses

Figure 7:
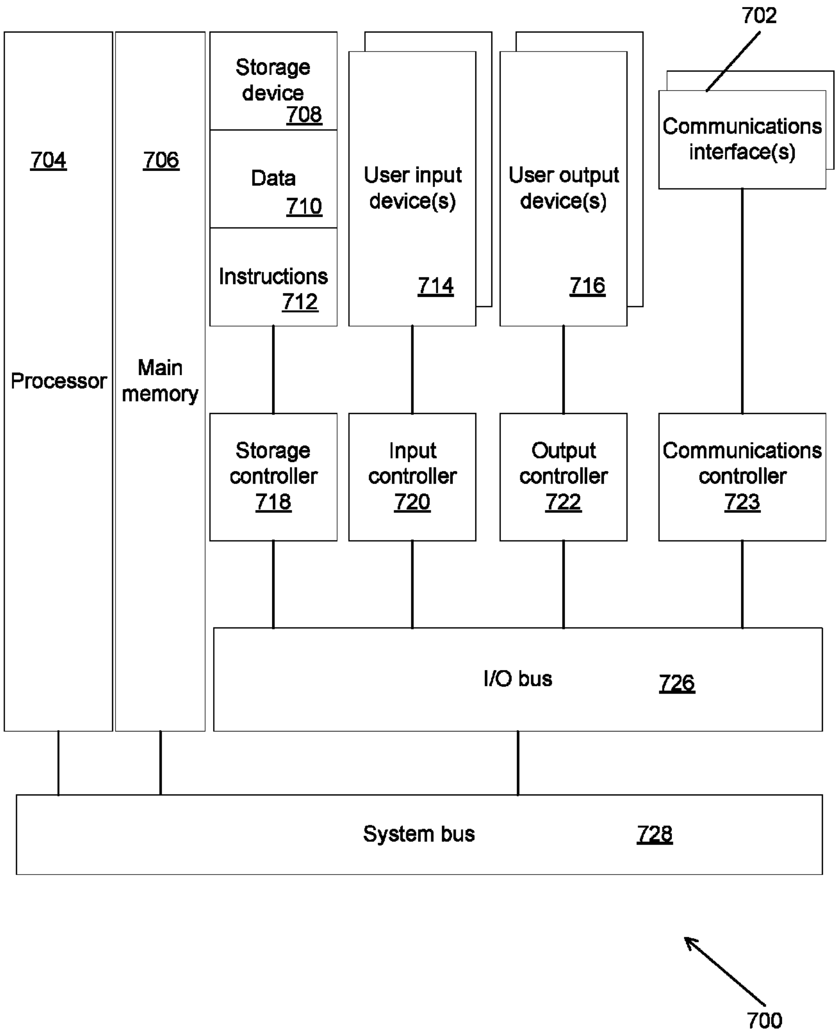
FIG. 7 is an illustration of a processing apparatus in accordance with various embodiments of the invention.

Any of a variety of processing apparatuses can host various components of a skill wagering interleaved game in accordance with embodiments of the invention. In several embodiments, these processing apparatuses can include, but are not limited to, a mobile device such as a tablet computer or a smartphone, an electronic gaming machine, a general purpose computer, a computing device, and/or a controller. A processing apparatus that is constructed to implement all or part of a skill wagering interleaved game in accordance with an embodiment of the invention is illustrated in FIG. 7.

In the processing apparatus 700, a processor 704 is coupled to a memory 706 by a system bus 728. The processor 704 is also coupled to non-transitory processor-readable storage medium, such as a storage device 708 that stores processor-executable instructions 712 and data 710 through the system bus 728 to an I/O bus 726 through a storage controller 718. The processor 704 is also coupled to one or more interfaces that can be used to connect the processor to other processing apparatuses as well as networks as described herein. The processor 704 is also coupled via the bus to user input devices 714, such as tactile devices including but not limited to keyboards, keypads, foot pads, touch screens, and/or trackballs, as well as non-contact devices such as audio input devices, motion sensors, and motion capture devices that the processing apparatus can use to receive inputs from a user when the user interacts with the processing apparatus. The processor 704 is connected to these user input devices 714 through the system bus 728, to the I/O bus 726, and through the input controller 720. The processor 704 is also coupled via the system bus 728 to user output devices 716 such as, but not limited to, visual output devices, audio output devices, and/or tactile output devices that the processing apparatus uses to generate outputs perceivable by the user when the user interacts with the processing apparatus. In several embodiments, the processor is coupled to visual output devices such as, but not limited to, display screens, light panels, and/or lighted displays. In a number of embodiments, the processor is coupled to audio output devices such as, but not limited to, speakers, and/or sound amplifiers. In many embodiments, the processor 704 is coupled to tactile output devices like vibrators, and/or manipulators. The processor 704 is connected to output devices from the system bus 728 to the I/O bus 726 and through the output controller 722. The processor 704 can also be connected to a communications interface 702 from the system bus 728 to the I/O bus 726 through a communications controller 724.

In various embodiments, the processor 704 can load instructions and data from the storage device into the memory. The processor 704 can also execute instructions that operate on the data to implement various aspects and features of the components of a skill wagering interleaved game as described herein. The processor 704 can utilize various input and output devices in accordance with the instructions and the data in order to create and operate player interfaces for players or operators of a skill wagering interleaved game (such as, but not limited to, a casino that hosts the skill wagering interleaved game).

Although the processing apparatus 700 is described herein as being constructed from a processor 704 and instructions stored and executed by hardware components, the processing apparatus 700 can be composed of only hardware components, or any combination thereof, in accordance with many embodiments. In addition, although the storage device is described as being coupled to the processor through a bus, those skilled in the art of processing apparatuses will understand that the storage device can include removable media such as but not limited to a USB memory device, an optical CD ROM, and magnetic media such as tape and disks. Also, the storage device can be accessed through one of the interfaces or over a network. Furthermore, any of the user input devices 714 or user output devices 716 can be coupled to the processor via one of the interfaces or over a network. In addition, although a single processor is described, those skilled in the art will understand that the processor 704 can be a controller or other computing device or a separate computer as well as be composed of multiple processors or computing devices.

In numerous embodiments, any of an RC.OS, GW.OS, or Eg as described herein can be implemented on multiple processing apparatuses, whether dedicated, shared or distributed in any combination thereof, or can be implemented on a single processing apparatus. In addition, while certain aspects and features of skill wagering interleaved game processes described herein have been attributed to an RC.OS, GW.OS, or Eg, these aspects and features can be implemented in a distributed form where any of the features or aspects can be performed by any of a RC.OS, GW.OS, Eg within a skill wagering interleaved game without deviating from the spirit of the invention.

Skill Wagering Interleaved Game Implementations

In several embodiments, a player can interact with a skill wagering interleaved game by using RC in interactions with a gambling game along with GWC and elements in interactions with a skill wagering interleaved game entertainment game. The gambling game can be executed by a RC.OS, while a skill wagering interleaved game entertainment game can be executed with an Eg and managed with a GW.OS.

Figure 8:
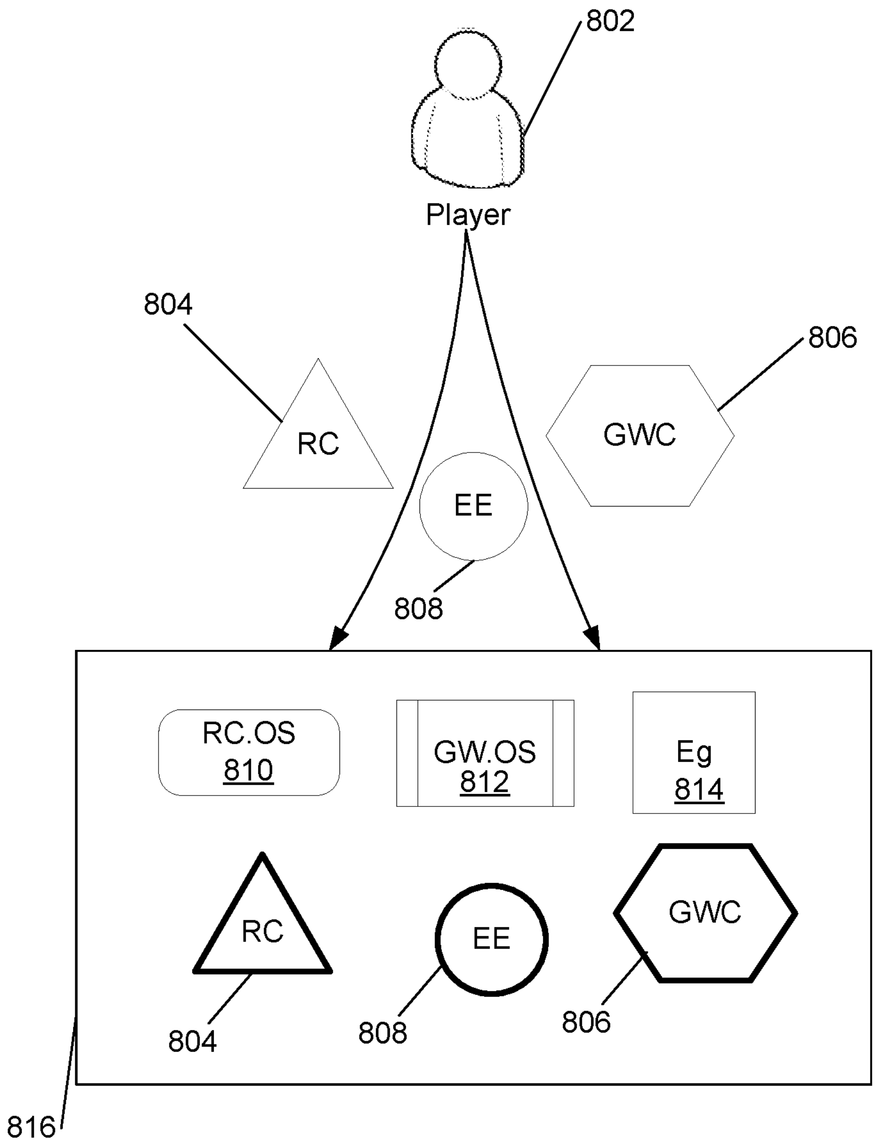
FIG. 8 is a process flow diagram that illustrates how resources are utilized in a skill wagering interleaved game in accordance with embodiments of the invention.

A conceptual diagram that illustrates how resources such as GWC, RC, and entertainment game elements, such as but not limited to EE, are utilized in a skill wagering interleaved game in accordance with an embodiment of the invention is illustrated in FIG. 8. The conceptual diagram illustrates that RC 804, EE 808, and GWC 806 can be utilized by a player 802 in interactions with the RC.OS 810, GW.OS 812 and Eg 814 of a skill wagering interleaved game 816. The contribution of elements, such as EE 808, can be linked to a player's access to credits, such as RC 804 or GWC 806. Electronic receipt of these credits can come via a smart card, voucher or other portable media, or as received over a network from a server. In certain implementations, these credits can be drawn on demand from a player profile located in a database locally on a skill wagering interleaved game or in a remote server.

Figure 9:
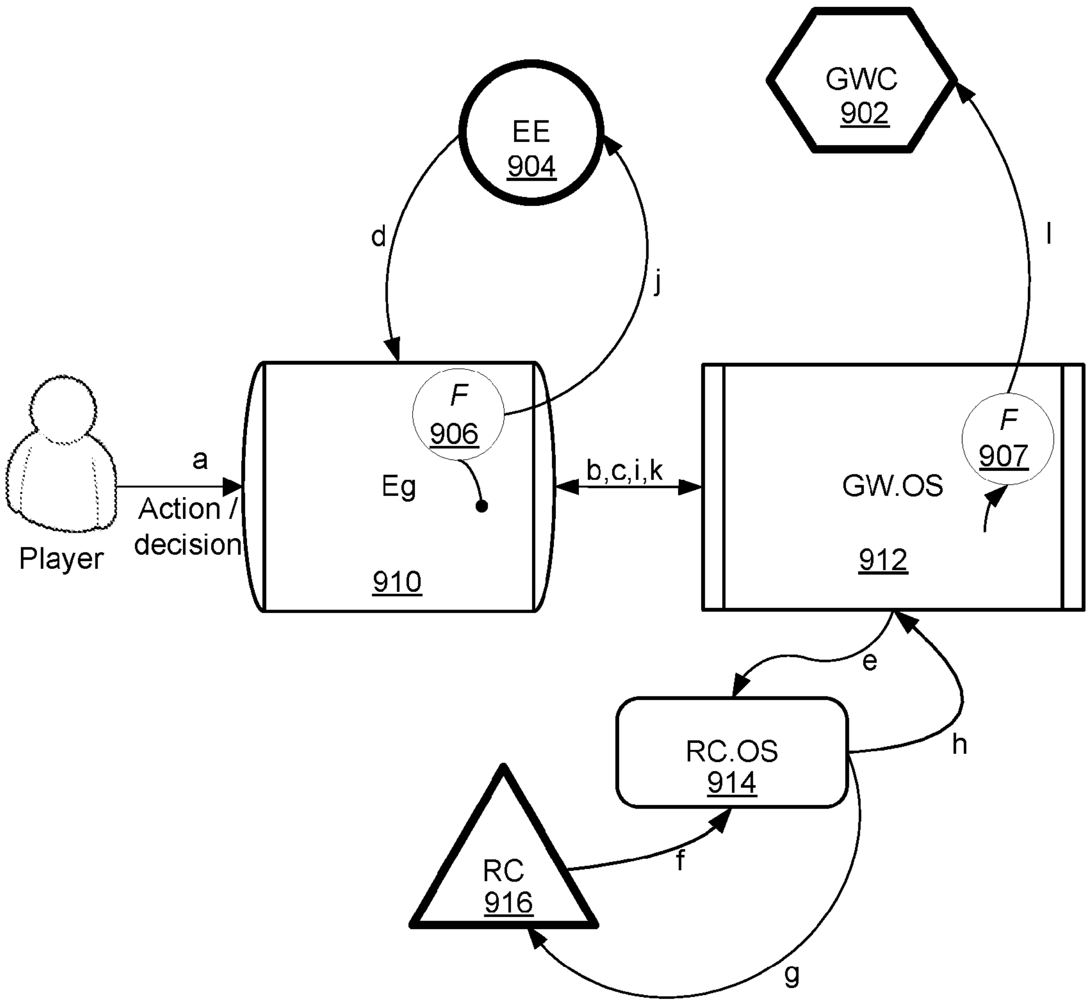
FIG. 9 is a process flow diagram that illustrates interplay between resources and components of a skill wagering interleaved game in accordance with embodiments of the invention.

A conceptual diagram that illustrates interplay between elements and components of a skill wagering interleaved game in accordance with an embodiment of the invention is illustrated in FIG. 9. Similar to FIG. 8, a player's actions and/or decisions can affect functions 906 that consume and/or accumulate GWC 902 and/or EE 904 in a skill wagering interleaved game entertainment game executed by an Eg 910, a RC.OS 914, and a GW.OS 912. The GW.OS 912 can monitor the activities taking place within a skill wagering interleaved game entertainment game executed by an Eg 910 for gameplay gambling event occurrences. The GW.OS 912 can also communicate the gameplay gambling event occurrences to the RC.OS 914 that triggers a wager of RC 916 in a gambling game executed by the RC.OS 914.

In the figure, the player commences interaction with the skill wagering interleaved game by contributing one or more of three types of credits to the skill wagering interleaved game, the three being: (i) RC 916 which is a currency fungible instrument, (ii) GWC 902, which are game world credits, and (iii) EE 904, which is the enabling element (EE) of the entertainment portion of the skill wagering interleaved game executed by the Eg 910. In many embodiments, an EE 904 is an element consumed by, traded or exchange in, operated upon, or used to enable the entertainment game portion of the skill wagering interleaved game. There may be one or more types of EE 904 present in a skill wagering interleaved game's entertainment game. Embodiments of EE 904 include, but are not limited to, bullets in a shooting game, fuel in a racing game, letters in a word spelling game, downs in a football game, potions in a character adventure game, character health points, etc.

The contribution of one or more of these elements may be executed by insertion into the skill wagering interleaved game of currency in the case of RC 916, and/or transferred in as electronic credit in the case of any of the RC 916, GWC 902, and EE 904. Electronic transfer in of these credits may come via a smart card, voucher, or other portable media, or as transferred in over a network from a patron server or skill wagering interleaved game player account server. In certain implementations, these credits may not be transferred into the skill wagering interleaved game, but rather drawn on demand from player accounts located in servers residing on the network or in the cloud on a real time basis as the credits are consumed by the skill wagering interleaved game. Once these credits are deposited, or a link to their availability is made, the skill wagering interleaved game has them at its disposal to use for execution of the skill wagering interleaved game. Generally, the RC 916 is utilized by and accounted for by the RC.OS 914, and the EE 904 and GWC 902 are utilized and accounted for by the GW.OS 912 and/or the Eg 910.

An operation of the skill wagering interleaved game is illustrated by the following table:

| | |
|---|---|
| a | The player performs an action or makes a decision through the skill wagering interleaved game UI |
| b | The Eg 910 signals the GW.OS 912 of the player decision or action taken |
| c | The GW.OS 912 signals to the Eg 910 as to the amount of EE 904 that will be consumed by the player action or decision. This signaling configures function 906 to control the EE 904 consumption, decay or addition |
| d | The Eg 910 consumes the amount of EE 904 designated by the GW.OS 912 to couple to the player action |
| e | The GW.OS 912 signals the RC.OS 914 as to the profile of the wager proposition associated with the particular action, and triggers the wager |
| f | The RC.OS 914 consumes RC for the wager and executes the wager |
| g | The RC.OS 914 returns RC depending on the outcome of the wager |
| h | The RC.OS 914 informs the GW.OS 912 as to the outcome of the wager |
| i | The GW.OS 912 signals the Eg 910 to add additional (or subtract, or add 0) EE 904 to one or more of the EEs of the Eg 910. This is reflected as function 906 in the figure |
| j | The Eg 910 reconciles the EE(s) of the entertainment game |
| k | The Eg 910 signals the GW.OS 912 as to its updated status, and the GW.OS 912 signals the Eg 910 to add additional (or subtract, or add) GWC 902 to one or more of the GWC 902 of the Eg 910. This is reflected in function 907 in the figure. |
| l | The GW.OS 912 reconciles the GWC(s) of the entertainment game |

The credit flow according to the process described above, can be illustrated by the following embodiment in a first person shooter game, such as Call of Duty® again using the same skill wagering interleaved game process:

| | |
|---|---|
| A | The player selects a machine gun to use in the skill wagering interleaved game. The player fires a burst at an opponent. {The player performs an action or makes a decision through the skill wagering interleaved game UI} |
| B | The Eg signals the GW.OS of the player's choice of weapon, that a burst of fire was fired, and the outcome of whether the player hit the opponent with the burst of fire {The Eg 910 signals the GW.OS 912 of the player decision or action taken} |
| C | The GW.OS processes the information in b above, and signals the Eg to consume 3 bullets (EE) with each pull of the trigger. {The GW.OS 912 signals to the Eg as to the amount of EE that will be consumed by the player action or decision. This signaling configures function 990 to control the EE consumption, decay or addition} |
| D | The Eg entertainment game consumes 3 bullets (EE) since the trigger was pulled. {The Eg 910 consumes the amount of EE 904 designated by the GW.OS 912 to couple to the player action} |
| E | The GW.OS signals the RC.OS that 3 credits of RC are to be wagered to match the 3 bullets (EE) consumed, on a particular pay table (Table Ln-RC) as a function how much damage the player inflicted on his/her opponent. {The GW.OS 912 signals to the RC.OS 914 as to the profile of the wager proposition associated with the particular action, and triggers the wager} |
| F | The RC.OS consumes the 3 credits for the wager and executes the specified wager {The RC.OS 914 consumes RC 916 for the wager and executes the wager} |
| G | The RC.OS determines that the player hits a jackpot of 6 credits, and returns these 6 credits of RC to the credit meter. {The RC.OS 914 returns RC 916 depending on the outcome of the wager} |
| H | The RC.OS informs the GW.OS that 3 credits of RC net, were won {The RC.OS 914 informs the GW.OS as to the outcome of the wager} |

-continued

| | |
|---|---|
| I | The GW.OS signals the Eg to add 3 bullets (EE) to the player's ammo clip<br>{The GW.OS 912 signals to the Eg 910 to add additional (or subtract, or add 0) EE 904 to one or more of the EEs of the Eg 910. This is reflected as function 906 in the figure} |
| J | The Eg adds back 3 bullets (EE) to the player's ammo clip in the entertainment game. This may take place by directly adding them to the clip, or may happen in the context of the entertainment game, such as the player finding extra ammo on the ground or in an old abandoned ammo dump.<br>{The Eg 910 reconciles the EE(s) of the entertainment game} |
| K | The GW.OS logs the new player score (GWC) in the skill wagering interleaved game (as a function of the successful hit on the opponent) based on Eg signaling, and signals the Eg to add 2 extra points to their score, because a jackpot was won.<br>{The Eg 910 signals the GW.OS 912 as to its updated status, and the GW.OS 912 signals the Eg 910 to add additional (or subtract, or add 0) GWC 902 to one or more of the GWC 902 of the Eg 910. This is reflected in function 907 in the figure} |
| L | the GW.OS adds 10 points to the player's score (GWC) given the success of the hit which in this embodiment is worth 8 points, plus the 2 extra points requested by GW.OS.<br>{The GW.OS 912 reconciles the GWC(s) of the entertainment game.} |

Note that the foregoing embodiments are intended to provide an illustration of how credits flow in a skill wagering interleaved game, but are not intended to be exhaustive, and only list only one of numerous possibilities of how a skill wagering interleaved game may be configured to manage its fundamental credits.

The skill wagering interleaved game system of FIG. 9 may also utilize virtual currency instead of RC. Virtual currency can be thought of as a form of alternate currency, which can be acquired, purchased or transferred, in unit or in bulk, by/to a player, but does not necessarily directly correlate to RC or real currency. In a particular embodiment, there is a virtual currency called "Triax Jacks," 1000 units of which are given to a player by an operator of a skill wagering interleaved game, with additional blocks of 1000 units being available for purchase for $5 USD for each block. Triax Jacks could be redeemed for various prizes, or could never be redeemed but simply used and traded purely for entertainment value by players. It would be completely consistent with the architecture of the skill wagering interleaved game that Triax Jacks would be wagered in place of RC, such that the skill wagering interleaved game could be played for free, or with played with operator sponsored Triax Jacks.

Figure 10A:
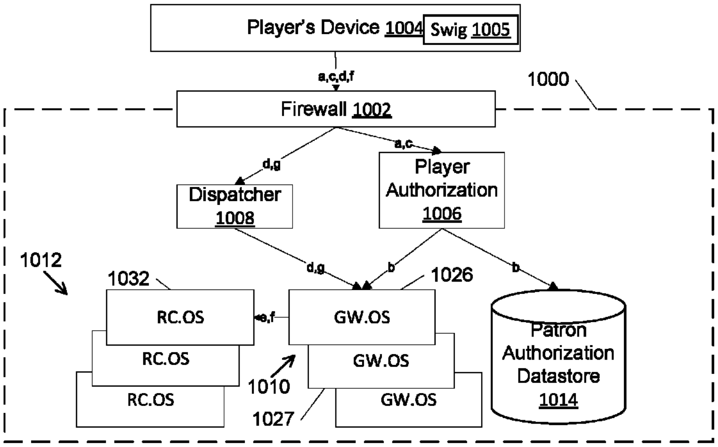
FIG. 10A is an architecture diagram of a system for implementing skill wagering interleaved game in accordance with embodiments of the invention.
Figure 10B:
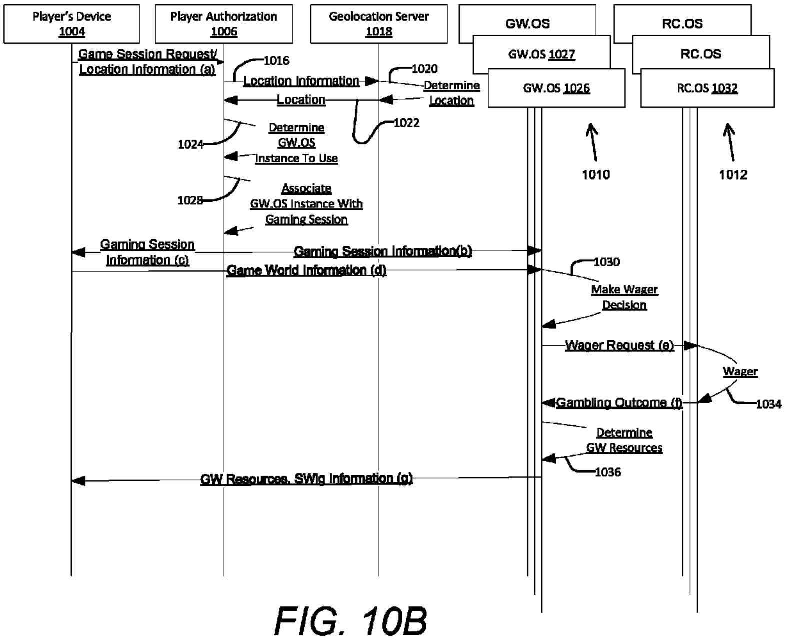
FIG. 10B is a sequence diagram for an operational process of a skill wagering interleaved game in accordance with embodiments of the invention.

FIG. 10A is an architecture diagram of a system for implementing a skill wagering interleaved game in accordance with embodiments of the invention and FIG. 10B is a sequence diagram for an operational process of a skill wagering interleaved game in accordance with embodiments of the invention. Referring now to FIGS. 10A and 10B, a system 1000 implementing a skill wagering interleaved game couples to a player's device 1004 over a network (not shown) such as a LAN or a WAN. The player's device 1004 includes instantiations of components of a skill wagering interleaved game 1005 that a player will play during a gaming session. A firewall 1002 admits communications from the player's device 1004 to a player authorization module 1006 and to a message dispatcher module 1008.

The system further includes one or a plurality of instances of GW.OSes 1010, which may run concurrently. In some embodiments, a plurality of GW.OSes 1010 are instantiated with configurations for different jurisdictions and/or different modes of play. For example, a GW.OS may be instantiated for a jurisdiction that does not allow real money gaming, in which case the GW.OS will operate using virtual currency. As another example, a GW.OS may be instantiated for a jurisdiction with real money gaming including using in-game purchases for game world objects by a player.

The system further includes one or a plurality of RC.OSes 1012, which may be running concurrently. In some embodiments, an RC.OS may be instantiated for real money gaming. In other embodiments, an RC.OS may be instantiated for virtual money gaming. In various embodiments, the GW.OSes 1010 and RC.OSes 1012 allow for any combination of real money gaming, virtual currency gaming, and in-game purchases to be conducted through appropriate configuration of a GW.OS and an RC.OS when they are instantiated by the system. The system also includes a patron authorization database 1014 used to store session information.

Referring to FIGS. 10A and 10B, in operation, the player's device 1004 communicates a request (a) for a gaming session to the player authorization module 1006. The gaming session request includes location information that may be communicated (1016; FIG. 10B) by the player authorization module 1006 to a geolocation server 1018, which uses the location information to determine (1020; FIG. 10B) the location of the player's device 1004. The location is communicated (1022; FIG. 10B) from the geolocation server 1018 to the player authorization module 1006.

The player authorization module 1006 determines (1024; FIG. 10B) which of the GW.OSes 1010 is appropriate for the player's device's location, and associates (1028; FIG. 10B) the GW.OS 1026 with the gaming session. For example, if the player's device 1004 is located where real money gaming is allowed, the player authorization module 1006 selects a GW.OS 1026 that enables real money gaming. However, if the player's device 1004 is located in a jurisdiction where real money gaming is not allowed, the player authorization module 1006 selects a GW.OS 1027 that enables virtual currency gaming and not real money gaming. The player authorization module 1006 communicates gaming session information (b) to the selected GW.OS 1026, thereby notifying the selected GW.OS 1026 that the selected GW.OS 1026 has been selected and bound to a gaming session. This information regarding the gaming session binding the selected GW.OS 1026 to the player's device 1004 is also stored in the patron authorization database 1014 for future reference. Information about the gaming session (c) is communicated to the player's device 1004 by the player authorization module 1006.

During the gaming session, the player's device 1004 communicates game world information (d) to the selected GW.OS 1026 through the dispatcher 1008. The game world information includes session information that the dispatcher 1008 broadcasts to all GW.OSes 1010 within the system 1000 that have been instantiated and bound to a gaming session. If the broadcast gaming session information matches the game session information that GW.OS 1026 has indicating that GW.OS 1026 was bound to that particular gaming session, the GW.OS 1026 receives the game world information and determines (1030; FIG. 10B) a wagering decision as described herein. If a wager is to be made, the GW.OS 1026 communicates a wager request (e) to an RC.OS 1032. The RC.OS 1032 receives the wager request and makes the requested wager (1034; FIG. 10B). The RC.OS 1032 communicates the gambling outcome (f) to the GW.OS 1026. The GW.OS 1026 receives the gambling outcome and determines (1036) what game world resources should be allocated in the gaming session as a result of the gambling outcome and game world information as described herein. The GW.OS 1026 communicates the game world resources and skill wagering interleaved game information (g) as described herein to the player's device 1004. A process of communicating game world information, making wagering requests, and executing a wager may be repeated continuously throughout a gaming session providing interleaved wagering within a skill-based interactive game.

In many embodiments, the dispatcher 1008, player authorization module 1006, RC.OSes 1012, GW.OSes 1010, and patron authorization datastore 1014 are all instantiated on the same hosting device and/or server. In some embodiments, the dispatcher 1008, player authorization module 1006, RC.OSes 1012, GW.OSes 1010, and patron authorization datastore 1014 may be instantiated on more than one hosting device and/or server.

Figure 11A:
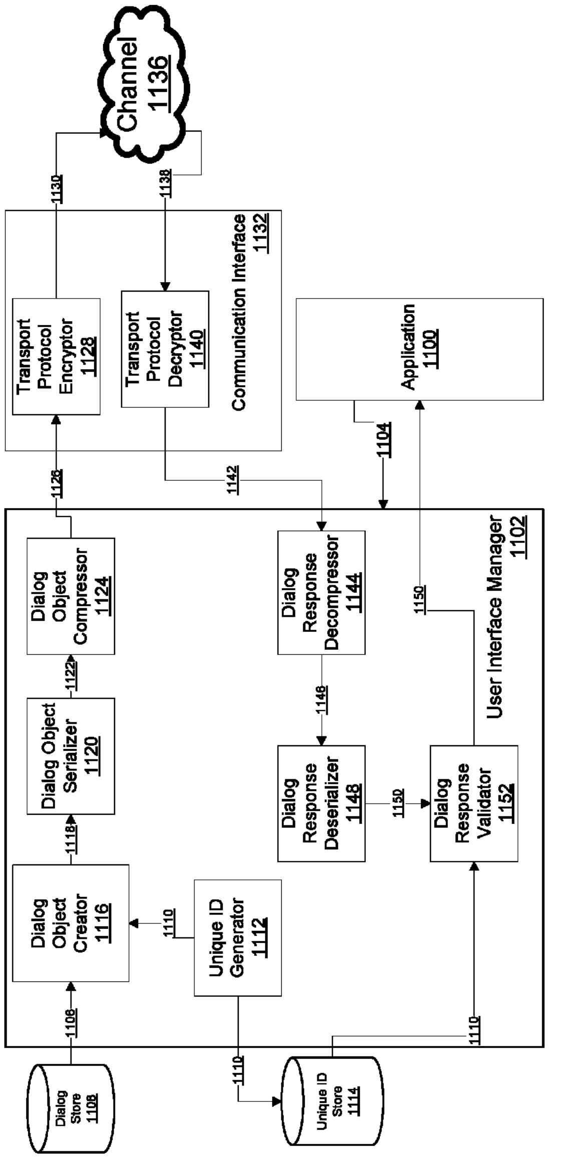
FIGS. 11A and 11B illustrate components of a user interface manager in accordance with embodiments of the invention.
Figure 11B:
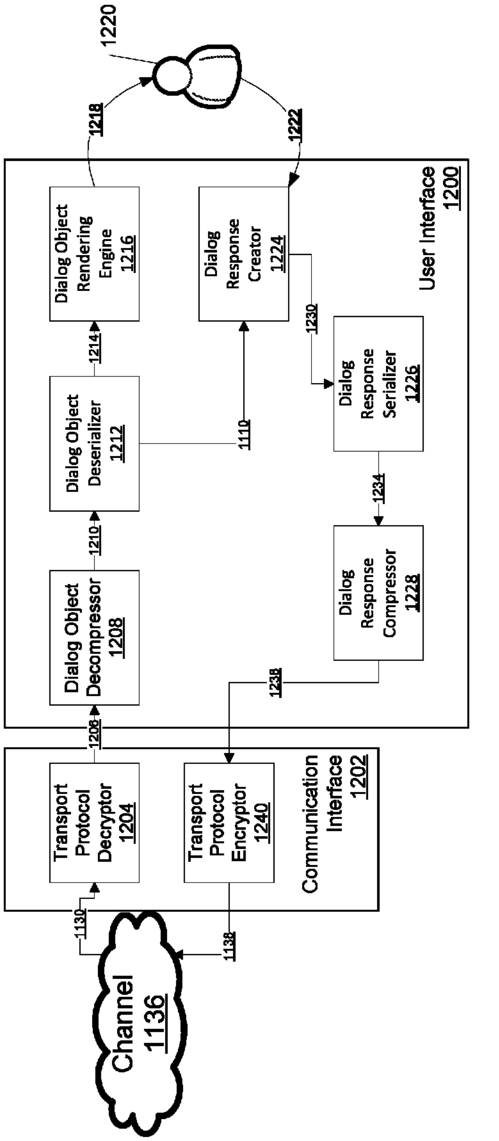

FIGS. 11A and 11B illustrate components of a user interface manager in accordance with embodiments of the invention. In this embodiment, a user interface manager 1102 is provided on a device or host that hosts a GW.OS, such as GW.OS 112 of FIG. 1, and may be a component of a player interface generator, such as player interface generator 144 of FIG. 1. The user interface manager 1102 provides dialog objects to a user interface 1200 (see, e.g., FIG. 11B), which is hosted on an end user device which hosts an Eg, such as Eg 120 of FIG. 1. The user interface 1200 may be a component of an interface of a skill wagering interleaved game, such as skill wagering interleaved game player interface 148. In some embodiments, the user interface manager 1102 is operatively connected to the user interface 1200 via a communications channel 1136. The communications channel 1136 may be part of a computer network, a wireless network, a local area network, a wide area network such as the Internet, an internal communications port between multiple devices, an internal communications port between software entities or services, or the like.

In operation, an application 1100, such as GW.OS 112 of FIG. 1, transmits signals encoding a request 1104 to the user interface manager 1102 for a specified dialog to be conducted with a player 1220 of a skill wagering interleaved game. In many embodiments, the dialog is a series of prompts 1218 that are presented to the player 1220 on a display device or the like to which the player 1220 responds by entering responses 1222 using an input device such as a keyboard, touchscreen, or the like. In various embodiments, the prompts could be part of a set of fields into which the player enters responses, the prompts may be auditory and the player inputs are through a speech recording or recognition system, the prompts may be selectable elements on the display device and the player inputs are selections made from the set of selections, or any combination of such prompt and player input types. The dialog is encapsulated in a dialog object that encodes the user prompts in a logical structure that guides the user through a structured dialog. In many embodiments, the unique dialog object 1118 is a hierarchal software object including data and instructions. Such a dialog object may include data for user prompts, instructions for structuring a presentation order and logic of the prompts, and instructions for collection of the user's responses to the prompts.

To generate the dialog object, the user interface manager 1102 utilizes a dialog object creator 1116. The dialog object creator 1116 determines, based on the dialog request 1104, what dialog object should be created and obtains an appropriate dialog template 1106 from a data store of dialog templates 1108. The dialog object creator also obtains a unique identifier 1110 from a unique identifier generator 1112. The unique identifier 1110 is an identifier that will be combined with the dialog template 1106 by the dialog object creator 1116 to create a unique dialog object 1118 that is identifiable or distinguishable from any other dialog objects that may be in process. The unique identifier 1110 is also stored in a unique identifier data store 1114 for later reference.

The unique dialog object 1118 is then transferred to a dialog object serializer 1120. The dialog object serializer 1120 transforms the unique dialog object into a string 1122 of symbols that encodes the unique dialog object for communication through the communications channel 1136. The string 1122 is input into a dialog object compressor 1124 that generates a compressed string 1126 by compressing the string 1122. The compressed string 1126 is then input into an interface 1132 including a transport protocol encryptor 1128. The transport protocol encryptor 1128 encrypts the compressed string 1126 into an encrypted string and the communication interface 1132 generates signals encoding the encrypted string 1130 that may be communicated across the communication channel 1136.

In several embodiments, compression of a dialog object reduces a size of the dialog object during communication between components of a skill wagering interleaved game that are distributed across a communications network, thus reducing the communication network bandwidth required for operation of the skill wagering interleaved game.

As shown in FIG. 11B, signals encoding the compressed and encrypted string 1130 are communicated through the communication channel 1136 to transport protocol decryptor 1204 of communication interface 1202 of the user interface 1200. The communication interface 1202 generates a compressed and encrypted string by decoding the signals encoding the compressed and encrypted string. The transport protocol decryptor 1204 decrypts the encrypted string 1130 and generates compressed string 1206. The compressed string 1206 is input into dialog object decompressor 1208 which generates string 1210 of symbols that encode the unique dialog object. The string 1210 is input into a dialog object deserializer 1212 that converts string 1210 into a dialog object 1214 having the same properties, including the unique identifier 1110, of dialog object 1118.

The dialog object 1214 is input into a dialog object rendering engine 1216. The dialog object rendering engine generates a series of user prompts 1218 that are used to prompt a player 1220 to input user responses 1222 as described herein. In some embodiments, the dialog object is an executable or interpretable software object containing instructions and data for execution of the dialog with the player 1220. In other embodiments, the dialog object is a document including instructions and data for execution of the dialog with the player.

The user responses 1222 to the prompts 1218 are captured by a dialog response creator 1224 that combines the user responses 1222 with the unique identifier 1110 that was communicated to the user interface 1200 in association with the dialog object 1214 communicated from the user interface manager 1102. The dialog response creator creates a dialog response 1230 that is a software object containing the user's responses 1222 and the unique identifier 1110. The dialog response is serialized by a dialog response serializer 1226 into a string 1234 of symbols representing the dialog response 1230. The string 1234 is compressed by a dialog response compressor 1228 to create a compressed string 1238. The compressed string is input to communication interface 1202 and encrypted into an encrypted string by a transport protocol encryptor 1240. The communication interface generates signals encoding the encrypted string

1138 that are communicated from the user interface 1200 to the user interface manager 1102 via communication channel 1136.

As shown in FIG. 11A, the signals encoding the encrypted string 1138 are received by the communication interface 1132 and the communication interface generates an encrypted string by decoding the signals encoding the encrypted string and the encrypted string is input into transport protocol decryptor 1140 that generates a decrypted string 1142. The decrypted string 1142 is input to a dialog response decompressor 1144, which generates a decompressed string 1146. The decompressed string 1146 is input into a dialog response deserializer 1148. The dialog response deserializer 1148 deserializes the decompressed string 1146 and generates a dialog response object 1150 including the unique identifier 1110.

The dialog response object 1150 is then input into a dialog response validator 1152. The dialog response validator 1152 receives the dialog response and validates the dialog response by using the unique identifier 1110. To do so, the dialog response validator reads the unique identifier contained in the dialog response and then queries the unique identifier data store 1114 to determine if the unique identifier included in the dialog response object 1150 is the same unique identifier that was included in the dialog object 1118 at the beginning of the process. If the unique identifier in the dialog response object 1150 is validated, then the dialog response object 1150 is returned or made available to the application 1100 for further processing.

In many embodiments, use of unique identifiers allows for asynchronous communication between components of a skill wagering interleaved game that are distributed across a communications network. In these embodiments, the user interface manager 1102 of FIG. 11A can generate one or more dialog objects for communication to one or more user interfaces, such as user interface 1200 of FIG. 11B. Once communication of the dialog objects is complete, the user interface 1200 uses the dialog object to interact with the player without further communication with the user interface manager. Once the player interaction is complete, the user interface communicates the dialog response back to the user interface manager. Accordingly, a continuous and synchronized communication channel need not be maintained between the interface manager and the one or more user interfaces, thus providing that a gaming session of the skill wagering interleaved game may not be halted by a temporary loss in connectivity between the components of the skill wagering interleaved game.

Figure 12A:
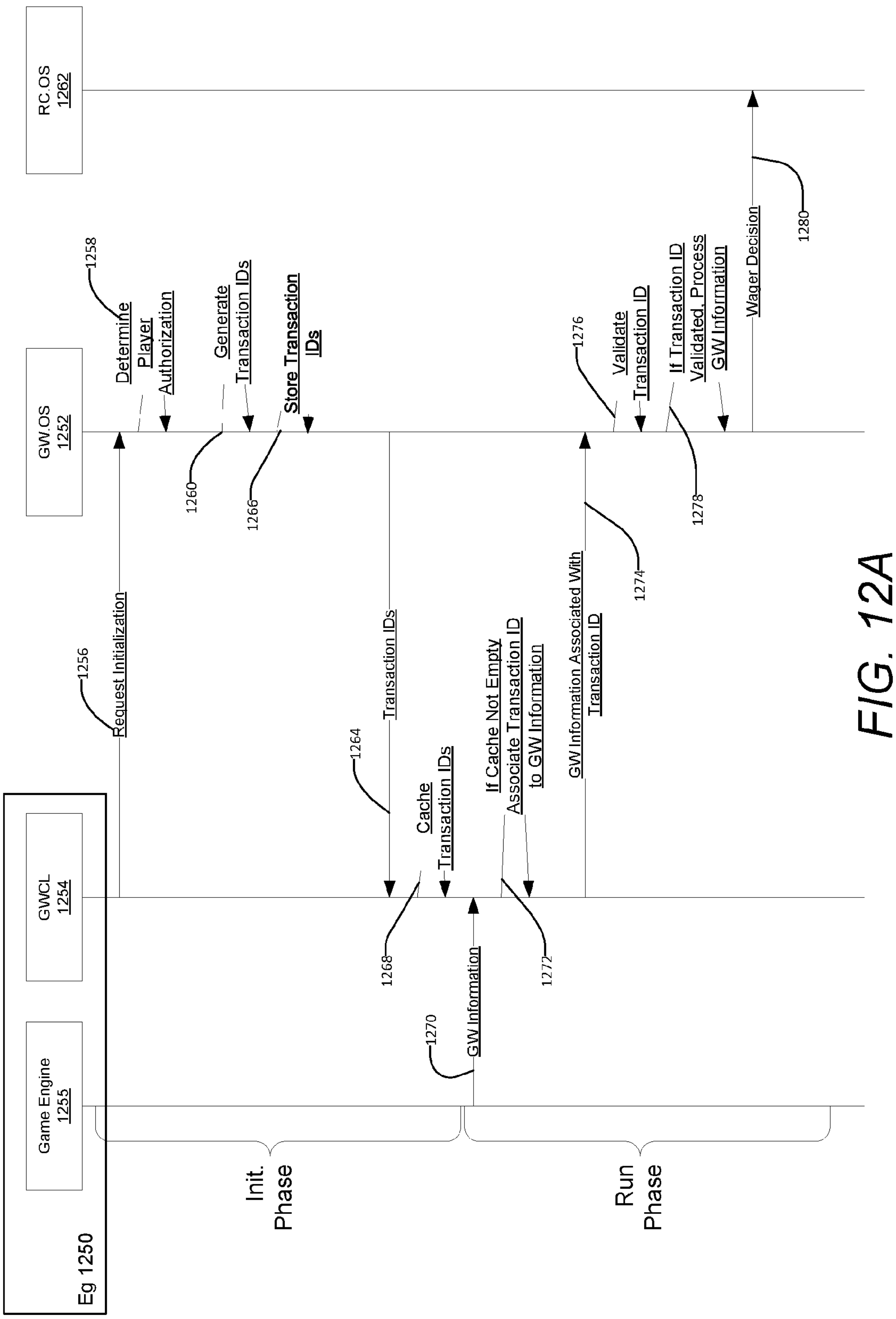
FIGS. 12A and 12B illustrate a process of pre-authorization of transactions for a skill wagering interleaved game in accordance with embodiments of the invention.
Figure 12B:
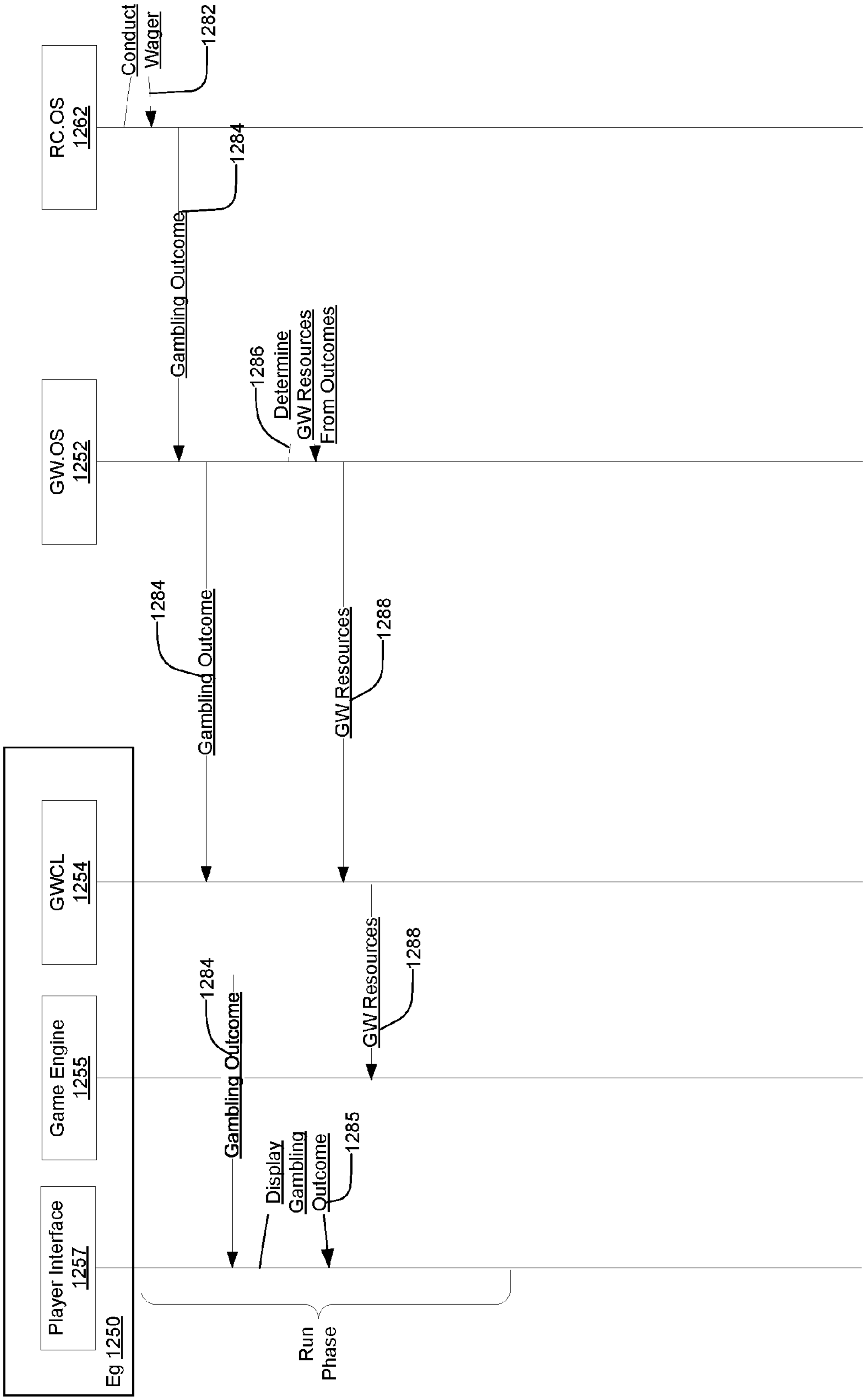

FIGS. 12A and 12B illustrate a process of pre-authorization of transactions for a skill wagering interleaved game in accordance with embodiments of the invention. As depicted in FIGS. 12A and 12B, an entertainment game (Eg) 1250 communicates with a game world operating system (GW.OS) 1252 using a game world control layer or client (GWCL) 1254. In some embodiments, a GWCL 1254 is responsible for providing initial processing for some transactions between the Eg 1250 and the GW.OS 1252. In the illustrated process, the GWCL 1254 provides processing for pre-authorized transactions.

In the process, in an initialization phase, the Eg 1250 requests initialization from the GW.OS 1252 through the GWCL 1254. To do so, the GWCL 1254 generates signals encoding the initialization request 1256, communicates the signals 1256 through a communications channel to the GW.OS 1252, and the GW.OS 1252 receives the signals 1256. In some embodiments, the initialization request also includes player information that is used to authenticate a player to the skill wagering interleaved game. The player information can be used, for example, to establish the identity of the player, determine if the player is authorized to play the skill wagering interleaved game, determine a geographical location of the player and account information indicating an account containing real credits that the player will be wagering in the skill wagering interleaved game (1258).

If the player is authorized by the GW.OS 1252, the GW.OS 1252 allocates or generates (1260) an amount of pre-authorized transaction identifiers for use by the GWCL 1254 to authorize and authenticate game world information received from the Eg 1250 and communicated to the GW.OS 1252. In some embodiments, each transaction identifier is a unique digital value that is generated by the GW.OS 1252. In various embodiments, the unique digital value is unique over a particular domain. By way of example, the domains may include, but are not limited to: an individual gaming session; a player's lifetime of gaming transactions with the operator of the pre-authorized transaction skill wagering interleaved game; a player's lifetime of gaming transactions with a particular component of the pre-authorized transaction skill wagering interleaved game (such as the Eg 1250, the GW.OS 1252, or the RC.OS 1262); and all transactions with pre-authorized transaction skill wagering interleaved games. In some embodiments, an amount of transaction identifiers that is created may be based upon, but not limited to, factors such as: a type of Eg being played (for example, a turn based game may need fewer transaction identifiers than a first person shooter action game); and an amount of real world credit that the player has committed to the pre-authorized transaction skill wagering interleaved game with more transaction identifiers being generated the more real world credits the player has committed.

The GW.OS 1252 generates signals encoding the amount of generated transaction identifiers 1264, communicates the signals 1264 through a communications channel to the GWCL 1254, and the GWCL 1254 receives the signals 1264. In addition, the GW.OS 1252 saves or stores (1266) the transaction identifiers in a local data store for later use. On receiving the transaction identifiers, the GWCL 1254 caches (1268) them for later use.

During a game session or run phase, a player plays the pre-authorized transaction skill wagering interleaved game. As the player plays the pre-authorized transaction skill wagering interleaved game, game world information is communicated (1270) to the GWCL 1254 by a game engine 1255 of the EG 1250. The GWCL 1254 receives the game world information and determines if the GWCL 1254 has any transaction identifiers left in the cache of the GWCL 1254. If so, the GWCL 1254 associates (1272) one or more transaction identifiers to the game world information and generates signals encoding the game world information with the one or more transaction identifiers, communicates the signals 1274 through a communications channel to the GW.OS 1252, and the GW.OS 1252 receives the signals 1274. In various embodiments, the transaction identifiers are associated with specified types of game world information that the GW.OS 1252 may base a wager decision upon. The specified types of game world information may include, but are not limited to: in a turn based game, a transaction identifier may be associated to game world information indicating each time a player takes their turn; in a first person shooter game, transaction identifiers may be associated with game world information indicating each virtual round fired from a virtual weapon; in a racing game, transaction identifiers may be associated with an amount of virtual fuel consumed by a virtual car being driven by the player.

In the case the GWCL 1254 does not have any additional transaction identifiers left in the cache of the GWCL 1254, the GWCL 1254 communicates signals encoding the game world information to the GW.OS 1252 without a transaction identifier or with an associated null transaction identifier.

The GW.OS 1252 receives the signals encoding the game world information from the GWCL 1254 and makes a determination of whether or not one or more transaction identifiers are associated with the game world information. If one or more transaction identifiers are associated with the received game world information, the GW.OS 1252 validates (1276) the one or more transaction identifiers by determining if the one or more transaction identifiers associated with the game world information are stored in the local data store of transaction identifiers of the GW.OS 1252. If so, the GW.OS 1252 uses or processes (1278) the game world information to make a wagering decision as described herein. Once the wagering decision is made, signals encoding the wagering decision are communicated (1280) to the RC.OS 1262.

Referring now to FIG. 12B, the RC.OS 1262 receives the signals encoding the wagering decision that are used to trigger or conduct (1282) a wager in the RC.OS 1262 and a gambling outcome is processed as described herein. The RC.OS 1262 communicates signals encoding the gambling outcome 1284 to the GW.OS 1252. The GW.OS 1252 receives the signals and forwards the signals encoding the gambling outcome 1284 to the GWCL 1254. The GWCL 1254 receives the signals encoding the gambling outcome and forwards the gambling outcome to a player interface 1257 of the Eg 1250. The player interface receives the gambling outcome and displays the gambling outcome to the player. In addition to forwarding the gambling outcome to the Eg for display to the player, the GW.OS 1252 uses the gambling outcome and game world information associated with the one or more transaction identifiers to determine (1286) game world resources that should be awarded to the player one the basis of the gambling outcome through the Eg 1250. The GW.OS 1252 then generates and communicates signals encoding the game world resource information 1288 to the GWCL 1254. The GWCL 1254 receives the signals and communicates the game world information to a game engine 1255 of the Eg 1250. The game engine receives the game world information and integrates the game world resources into an entertainment game for use by the player while playing the entertainment game.

If the game world information is not associated with a transaction identifier, or the transaction identifier cannot be validated, then the GW.OS 1252 may make additional processing decisions. In some embodiments, the GW.OS 1252 may treat the lack of a valid transaction identifier as an indication that the GW.OS 1252 is coupled to an invalid Eg 1250. In many embodiments, the GW.OS 1252 may determine that the GW.OS 1252 is communicating with an Eg 1250 being used by a player attempting to cheat or otherwise compromise the gaming system.

In some embodiments, a single GW.OS may be coupled to one or more Egs and/or GWCLs. In such an embodiment, the transaction identifier is used to allow for asynchronous communications with the one or more Egs and/or GWCLs as the GW.OS can issue multiple sets of transaction identifiers, and then wait to receive game world information and associated transactions identifiers in order to process wagering decisions and allocation game world resources.

In many embodiments, use of transaction identifiers allows for asynchronous communication between components of a skill wagering interleaved game that are distributed across a communications network, thus providing that a gaming session of the skill wagering interleaved game may not be halted by a temporary loss in connectivity between the components of the skill wagering interleaved game.

In some embodiments, the functions of the GWCL are performed directly by the entertainment game.

Figure 13:
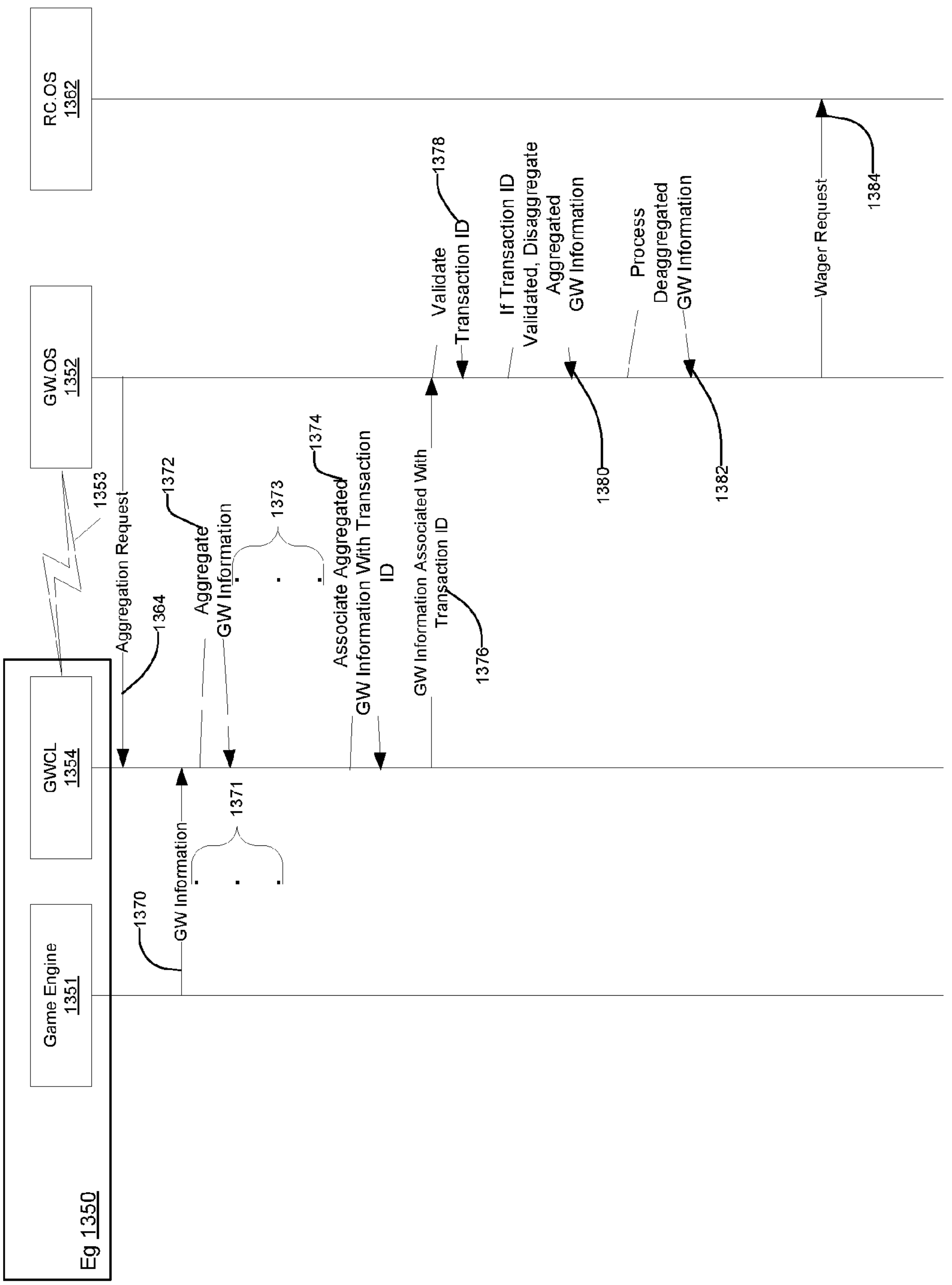
FIG. 13 illustrates a process of aggregating game world information for a skill wagering interleaved game in accordance with embodiments of the invention.

FIG. 13 illustrates a process of aggregating game world information for a skill wagering interleaved game in accordance with embodiments of the invention. Aggregation of the game world information is a process that may be used to relieve network congestion caused by a GW.OS becoming overloaded by having to process multiple sets of game world information from a plurality of Egs. As illustrated, an entertainment game (Eg) 1350 includes a game engine 1351 operatively connected to a game world control layer or client (GWCL) 1354. The GWCL is operatively connected to a game world operating system (GW.OS) 1352 via a communications network 1353.

As described herein, during normal operation of the Eg by a player, the game engine 1351 communicates game world information 1370 to the GWCL 1354. The GWCL 1354 receives the game world information, generates and communicates signals encoding the game world information to the GW.OS 1352 through a communications channel. The GW.OS 1352 receives the signals encoding the game world information from the GWCL 1354 and determines whether or not a wager request should be made to the real credit operating system (RC.OS) 1362. If so, the GW.OS 1352 generates a wager request and communicates the wager request to the RC.OS 1362. The RC.OS 1362 receives the wager request and generates a gambling outcome in response to, and in accordance with, the wager request. The RC.OS 1362 communicates signals including the gambling outcome to the GW.OS 1352. The GW.OS receives the signals including the gambling outcome from the RC.OS 1362 and generates and communicates signals encoding the gambling outcome to the GWCL 1354. The GWCL 1354 receives the signals encoding the gambling outcome and the gambling outcome is used to generate a display for display to the player in the context of the Eg 1350. The process is repeated throughout a gaming session providing interleaved wagering within the context of the Eg.

In many embodiments, the GW.OS 1352 is operatively connected to a plurality of GWCLs and Egs. During operation, the GW.OS may become overloaded causing congestion leading to diminished responsiveness of the skill wagering interleaved game as perceived by the player. In such a case, the GW.OS 1352 detects the congestion condition and communicates signals encoding an aggregation request 1364 to the GWCL 1354. The GWCL 1354 receives the signals encoding the aggregation request and in response to the aggregation request, the GWCL 1354 enters a mode in which the GWCL 1354 aggregates game world information 1370 that the GWCL 1354 receives from the game engine 1351 of the Eg 1350.

The form of the aggregation of game world information includes, but is not limited to, counting, summing or otherwise tracking instances of particular actions taken by a player of the Eg. For example, in some embodiments, if the Eg is a first person shooter game, the aggregated game world information may include an amount of ammunition used by the player, the number and types of targets hit by the player, the types of weapons used by the player, etc. In other embodiments, such as when a player is playing a racing game, the particular actions may include a distance traveled by the player, an average speed achieved by the player, a maximum or minimum speed achieved by a player, an amount of fuel expended by the player, etc. As indicated by ellipses 1371 and 1373, the aggregation is performed for a series of player interactions and related game world information. The duration of each aggregation may be specified by one or more parameters, such as but not limited to: a specified duration of time, a specified number of player interactions, a specified amount of game world information, a specified event is detected in the game world information, etc. In some embodiments, not only are player interactions of the same type aggregated, but different types of player interactions may be aggregated together. In some embodiments, the GW.OS signals the GWCL to specify the duration of aggregation. Accordingly, the GW.OS may increase the duration of aggregation as congestion of the GW.OS increases and decrease the duration of aggregation as congestion of the GW.OS decreases.

When the aggregation is complete, the GWCL 1354 associates 1374 the aggregated game world information with one or more transaction identifiers as described herein. The GWCL 1354 generates and communicates signals encoding the aggregated game world information associated with a transaction identifier 1376 to the GW.OS 1352 through a communications channel.

In some embodiments, as the aggregated game world information represents a plurality of player interactions, an amount of data that is communicated between the GWCL 1354 and the GW.OS 1352 is reduced as compared to multiple communications of game world information without aggregation. In addition, some of the overhead of multiple communications may be avoided as only a single communication occurs. Through the reduction in the amount of data transferred, and the reduction in overhead of managing multiple communications, congestion at the GW.OS may be reduced.

The GW.OS receives the signals encoding the aggregated game world information associated with one or more transaction identifiers 1376 and validates 1378 the one or more transaction identifiers as described herein. If the one or more transaction identifiers are validated, the GW.OS 1352 disaggregates the aggregated game world information for processing to determine if a wager request 1384 should be made to an RC.OS 1362 and processed as described herein.

In some embodiments, the functions of the GWCL are performed directly by the entertainment game.

Figure 14:
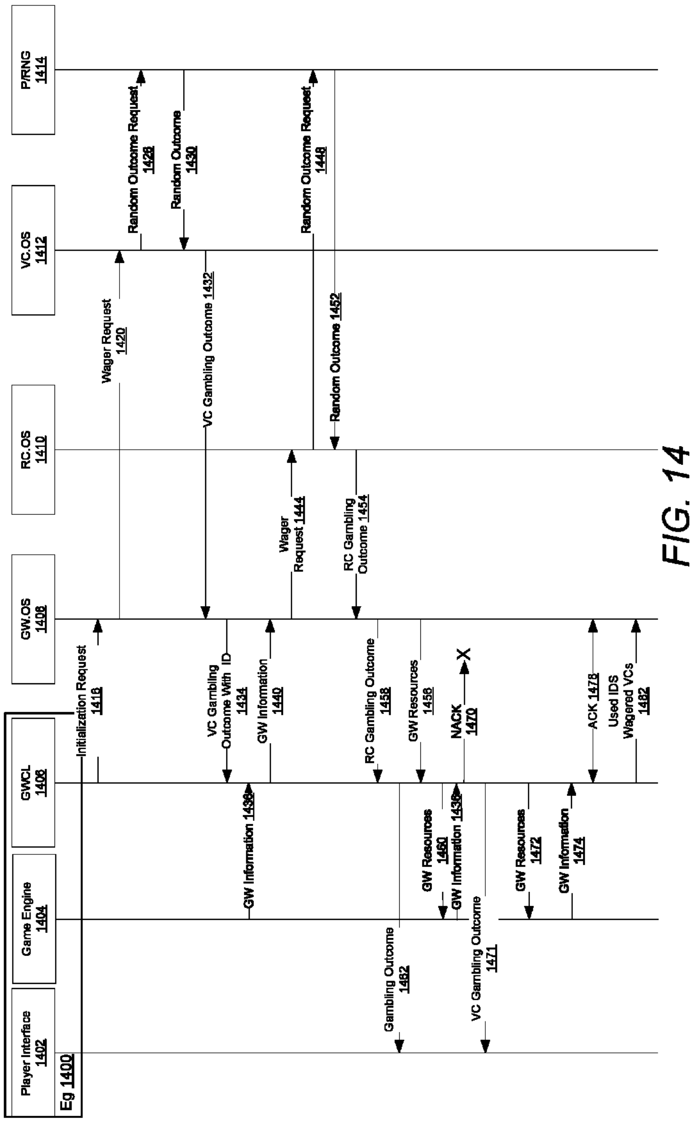
FIG. 14 illustrates a process of using cached gambling outcomes for a skill wagering interleaved game in accordance with embodiments of the invention.

FIG. 14 illustrates a skill wagering interleaved game system utilizing cached gambling outcomes in accordance with embodiments of the invention. Through the utilization of cached gambling outcomes, operation of a skill wagering interleaved game may be maintained during a condition of intermittent connectivity between a game world control layer or client of an entertainment game and a game world operating system. In operation, a game world control layer or client (GWCL) 1406 of an entertainment game (Eg) 1400 generates signals encoding an initialization request 1416, transmits the signals 1416 through a communications channel to a game world operating system (GW.OS) 1406 and the GW.OS 1406 receives the signals 1416. In response to initialization request, the GW.OS 1406 generates signals encoding a virtual credit wager request 1420, transmits the signals 1420 through a communications channel to a virtual credit operating system (VC.OS) 1412 and the VC.OS 1412 receives the signals 1412. In response to the virtual credit wager request, the VC.OS 1412 generates signals encoding a random outcome request, transmits the signals through a communication channel to a pseudo random or random number generator (P/RNG) 1414 and the P/RNG 1414 receives the signals 1426. In response to the random outcome request, the P/RNG generates signals encoding a random outcome 1430, transmits the signals 1430 through a communications channel to the VC.OS 1412, and the VC.OS 1412 receives the signals 1430. The VC.OS 1412 utilizes the random outcome to generate a virtual credit gambling outcome. In many embodiments, the virtual credit gambling outcome is in accordance with a wager of a single virtual credit. This is so that the virtual gambling outcome can be scaled at a later time to represent a wager of more than one virtual credit. The VC.OS 1412 generates signals 1432 encoding the virtual credit gambling outcome, transmits the signals 1432 through a communications channel to the GW.OS 1408, and the GW.OS 1408 receives the signals 1432.

The GW.OS 1408 associates the virtual gambling outcome with a unique identifier and stores the virtual gambling outcome associated with the unique identifier for later use in validating use of the virtual credit gambling outcome. The GW.OS 1408 generates signals 1434 encoding the virtual gambling outcome associated with the unique identifier, transmits the signals 1434 through a communications channel to the GWCL 1406, and the GWCL 1406 receives the signals 1434. The GWCL 1406 stores the virtual gambling outcome associated with the unique identifier for later use.

In some embodiments, the GW.OS generates a plurality of virtual credit gambling outcomes that are communicated to the GWCL 1406 and cached.

During normal operation, when a player is playing a skill wagering interleaved game, a game engine 1404 of the Eg 1400 communicates game world information 1436 to the GWCL 1406. The GWCL 1406 generates signals 1440 encoding the game world information, transmits the signals 1440 through a communications channel to the GW.OS 1408, and the GW.OS 1408 receives the signals. The GW.OS 1408 generates a wager request utilizing the game world information. The GW.OS 1408 generates signals 1444 encoding the wager request, transmits the signals 1444 through a communications channel to a real credit operating system (RC.OS) 1410, and the RC.OS 1410 receives the signals 1444. In response to the wager request, the RC.OS 1410 generates signals 1448 encoding a request for a random outcome, transmits the signals 1448 through a communications channel to the P/RNG 1414, and the P/RNG 1414 receives the signals 1448. In response to the random outcome request, the P/RNG 1414 generates a random outcome, generates signals 1452 encoding the random outcome, transmits the signals 1452 through a communications channel to the RC.OS 1410, and the RC.OS 1410 receives the signals 1452. The RC.OS 1410 utilizes the random outcome to generate a real credit gambling outcome, generates signals 1454 encoding the real credit gambling outcome, transmits the signals 1454 through a communications channel to the GW.OS 1408, and the GW.OS 1408 receives the signals 1454. The GW.OS communicates signals 1458 encoding the real credit gambling outcome to the GWCL 1406 and the GWCL 1406 receives them. The GWCL communicates the real credit gambling outcome 1462 to a player interface 1402 of Eg 1400 and the player interface 1402 displays the real credit gambling outcome to the player as described herein. The GW.OS 1408 uses the real credit gambling outcome and the game world information to generate game world resources for the Eg as described herein. The GW.OS generates and communicates signals 1456 encoding the game world resources to the GWCL 1406 and the GWCL 1406 receives the signals. The GWCL communicates the game world resources 1460 to the game engine 1404. The game engine uses the game world resources to execute and display an interactive game to a player as described herein.

When communications are disrupted between the GWCL 1406 and the GW.OS 1408, the GWCL uses the cached virtual credit gambling outcomes to simulate wagering, thus allowing a player to continue playing the skill wagering interleaved game even though communications may be momentarily disrupted. In such an operational mode, the game engine 1404 communicates game world information to the GWCL 1406. The GWCL receives the game world information and attempts to communicate the game world information to the GW.OS 1408. When the communication attempt fails 1470, the GWCL 1406 communicates one or more virtual credit gaming outcomes 1471 to the player interface 1402. The player interface receives the virtual credit gambling outcomes and displays the virtual credit gambling outcomes to the player in a context separate from a context of real credit gambling results.

In some embodiments, the GWCL 1406 may determine game world resources 1472 to communicate to the game engine 1404 on the basis of the game world information and the virtual credit gambling outcomes.

When the GWCL 1406 receives additional game world information 1474 communicated from the game engine 1404, the GWCL attempts to reestablish communications 1478 with the GW.OS 1406. If the GWCL 1406 is successful in reestablishing communications, the GWCL 1406 generates and communicates signals encoding transaction ids of the used virtual credit gambling outcomes 1428 to the GW.OS 1408. The GW.OS 1408 validates the used virtual credit gambling outcomes using the transaction ids for further processing.

While the above description may include many specific embodiments of the invention, these should not be construed as limitations on the scope of the invention, but rather as an example of one embodiment thereof. It is therefore to be understood that the invention can be practiced otherwise than specifically described, without departing from the scope and spirit of the invention. Thus, embodiments of the invention should be considered in all respects as illustrative and not restrictive.

What is claimed is:

1. A networked gaming system comprising:

an entertainment game controller operatively connected to a game world control layer, wherein the entertainment game engine is constructed to:
- communicate to the game world control layer via the network, game world information;
- receive, from the game world control layer, a gambling outcome; and
- display the gambling outcome;

the game world control layer operatively connected to a game world controller via a network, wherein the game world control layer is constructed to:
- receive, from the entertainment game controller, the game world information;
- receive, from the game world controller an aggregation request;
- aggregate the game world information;
- associate the aggregated game world information with a transaction identifier;
- encode the aggregated game world information associated with the transaction identifier;
- communicate the encoded game world information to the game world controller;
- receive, from the game world controller via the network, a gambling outcome; and
- communicate the gambling outcome to the entertainment game controller;

the game world controller operatively connected to the game world control layer and a real world controller, wherein the game world controller is constructed to:
- determine whether the aggregation request should be made to the game world control layer;
- generate the aggregation request in response to the determination;
- communicate the aggregation request to the game world control layer;
- receive, from the game world control layer, the encoded game world information;
- validate the transaction identifier associated with the aggregated game world information;
- responsive to the transaction identifier being valid, disaggregate the aggregated game world information;
- determine, based on the disaggregated game world information, whether a wager request should be made to the real world controller;
- generate the wager request in response to the determination;
- communicate the wager request to the real world controller;
- receive, from the real world controller via the network, the gambling outcome; and
- communicate to the game world control layer via the network, the gambling outcome; and the real world controller connected by the network to the game world controller, wherein the real world controller is constructed to:
- receive, from the game world controller via the network, the wager request;
- determine the gambling outcome based on the wager request using a random number generator; and
- communicate, to the game world controller via the network, the gambling outcome.

2. The networked gaming system of claim 1, wherein the game world controller is further constructed to:
- identify diminished responsiveness in the game world control layer; and
- determine whether the aggregation request should be made to the game world control layer based on the identified diminished responsiveness.

3. The networked gaming system of claim 1, wherein the aggregated game world information includes particular actions taken by a player of the entertainment game.

4. The networked gaming system of claim 1, wherein the aggregated game world information includes a plurality of players' interactions.

5. The networked gaming system of claim 1, wherein the duration of the aggregation request may be determined by one or more parameters.

6. The networked gaming system of claim 5, wherein the parameter is a specified duration of time.

7. The networked gaming system of claim 5, wherein the parameter is a specified number of player interactions.

8. A networked gaming system comprising:

an entertainment game controller operatively connected to a game world controller, wherein the entertainment game engine is constructed to:

receive, from the game world controller an aggregation request;

aggregate the game world information;

associate the aggregated game world information with a transaction identifier;

encode the aggregated game world information associated with the transaction identifier;

communicate the encoded game world information to the game world controller;

receive, from the game world controller via the network, a gambling outcome; and display the gambling outcome;

the game world controller operatively connected to the entertainment game controller and a real world controller, wherein the game world controller is constructed to:

determine whether the aggregation request should be made to the entertainment game controller;

generate the aggregation request in response to the determination;

communicate the aggregation request to the entertainment game controller;

receive, from the entertainment game controller, the encoded game world information;

validate the transaction identifier associated with the aggregated game world information;

responsive to the transaction identifier being valid, disaggregate the aggregated game world information;

determine, based on the disaggregated game world information, whether a wager request should be made to the real world controller;

generate the wager request in response to the determination;

communicate the wager request to the real world controller;

receive, from the real world controller via the network, the gambling outcome; and communicate to the entertainment game controller via the network, the gambling outcome; and the real world controller connected by the network to the game world controller, wherein the real world controller is constructed to:

receive, from the game world controller via the network, the wager request;

determine the gambling outcome based on the wager request using a random number generator; and communicate, to the game world controller via the network, the gambling outcome.

9. The networked gaming system of claim 8, wherein the game world controller is further constructed to:

identify diminished responsiveness in the entertainment game controller; and determine whether the aggregation request should be made to the entertainment game controller based on the identified diminished responsiveness.

10. The networked gaming system of claim 8, wherein the aggregated game world information includes particular actions taken by a player of the entertainment game.

11. The networked gaming system of claim 8, wherein the aggregated game world information includes a plurality of players' interactions.

12. The networked gaming system of claim 8, wherein the duration of the aggregation request may be determined by one or more parameters.

13. The networked gaming system of claim 12, wherein the parameter is a specified duration of time.

14. The networked gaming system of claim 12, wherein the parameter is a specified number of player interactions.

15. A networked gaming system comprising:

an entertainment game controller operatively connected to a game world controller, wherein the entertainment game engine is constructed to:

receive, from the game world controller an aggregation request;

aggregate the game world information;

associate the aggregated game world information with a transaction identifier;

encode the aggregated game world information associated with the transaction identifier;

communicate the encoded game world information to the game world controller;

receive, from the game world controller via the network, a gambling outcome; and display the gambling outcome;

the game world controller operatively connected to the entertainment game controller and a real world controller, wherein the game world controller is constructed to:

determine whether the aggregation request should be made to the entertainment game controller;

generate the aggregation request in response to the determination;

communicate the aggregation request to the entertainment game controller;

receive, from the entertainment game controller, the encoded game world information;

validate the transaction identifier associated with the aggregated game world information;

responsive to the transaction identifier being valid, disaggregate the aggregated game world information;

determine, based on the disaggregated game world information, whether a wager request should be made to the real world controller;

generate the wager request in response to the determination;

communicate the wager request to the real world controller;

receive, from the real world controller via the network, the gambling outcome; and communicate to the entertainment game controller via the network, the gambling outcome.

16. The networked gaming system of claim 15, wherein the game world controller is further constructed to:

identify diminished responsiveness in the entertainment game controller; and determine whether the aggregation request should be made to the entertainment game controller based on the identified diminished responsiveness.

17. The networked gaming system of claim 15, wherein the aggregated game world information includes particular actions taken by a player of the entertainment game.

18. The networked gaming system of claim 15, wherein the aggregated game world information includes a plurality of players' interactions.

19. The networked gaming system of claim 15, wherein the duration of the aggregation request may be determined by one or more parameters.

20. The networked gaming system of claim 19, wherein the parameter is a specified duration of time.

21. The networked gaming system of claim 19, wherein the parameter is a specified number of player interactions.

* * * * *